US012231945B2

(12) United States Patent
Chunduri et al.

(10) Patent No.: US 12,231,945 B2
(45) Date of Patent: Feb. 18, 2025

(54) INTEGRATED BACKHAUL TRANSPORT FOR 5GS

(71) Applicant: Huawei Technologies Co., Ltd., Shenzhen (CN)

(72) Inventors: Uma S. Chunduri, Fremont, CA (US); Renwei Li, Fremont, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/427,200

(22) Filed: Jan. 30, 2024

(65) Prior Publication Data

US 2024/0172035 A1 May 23, 2024

Related U.S. Application Data

(63) Continuation of application No. 18/073,234, filed on Dec. 1, 2022, now abandoned, which is a continuation (Continued)

(51) Int. Cl.
*H04W 28/02* (2009.01)
*H04W 28/08* (2023.01)
(Continued)

(52) U.S. Cl.
CPC ... *H04W 28/0263* (2013.01); *H04W 28/0992* (2020.05); *H04W 28/10* (2013.01); *H04W 40/02* (2013.01); *H04W 40/246* (2013.01)

(58) Field of Classification Search
None
See application file for complete search history.

(56) References Cited

U.S. PATENT DOCUMENTS 9,450,817 B1    9/2016  Bahadur et al.
9,705,781 B1    7/2017  Medved et al.
(Continued)

FOREIGN PATENT DOCUMENTS

EP      2985951 A1      2/2016
WO      2018044209 A1   3/2018

OTHER PUBLICATIONS

"3rd Generation Partnership Project; Technical Specification Group Services and System Aspects; System Architecture for the 5G System; Stage 2 (Release 15)," 3GPP TS 23.501, V1.5.0, Technical Specification, Nov. 2017, 170 pages.
(Continued)

*Primary Examiner* — Kenny S Lin
(74) *Attorney, Agent, or Firm* — Conley Rose, P.C.

(57) ABSTRACT

A mechanism is disclosed operating a transport network function (TNF) as part of a fifth generation wireless (5G) virtualized control plane. The mechanism includes receiving a request to compute a traffic engineering (TE) path in a 5G transport network for a packet data unit (PDU) session, the request received from a 5G virtualized control plane function via a service based interface (SBI) bus. Network topology information for the 5G transport network is obtained via a northbound interface (Nn). A TE path across the 5G transport network is computed for the PDU session based on the network topology information. A TE path identifier for the TE path computed for the PDU session is returned via the SBI bus.

20 Claims, 9 Drawing Sheets

Related U.S. Application Data of application No. 17/144,555, filed on Jan. 8, 2021, now Pat. No. 11,546,793, which is a continuation of application No. PCT/US2019/041172, filed on Jul. 10, 2019.

(60) Provisional application No. 62/696,214, filed on Jul. 10, 2018.

(51) Int. Cl.
*H04W 28/10* (2009.01)
*H04W 40/02* (2009.01)
*H04W 40/24* (2009.01)

(56) References Cited

U.S. PATENT DOCUMENTS

| | | | |
|---|---|---|---|
| 9,838,268 B1 | 12/2017 | Mattson | |
| 11,706,099 B2* | 7/2023 | Chitalia | G06F 9/5072 709/224 |
| 2013/0031271 A1* | 1/2013 | Bosch | H04W 84/042 709/245 |
| 2013/0272256 A1* | 10/2013 | Mihaly | H04W 72/04 370/329 |
| 2014/0098673 A1* | 4/2014 | Lee | H04L 41/122 370/255 |
| 2015/0200838 A1 | 7/2015 | Nadeau et al. | |
| 2017/0317780 A1 | 11/2017 | Wood et al. | |
| 2018/0262924 A1* | 9/2018 | Dao | H04W 72/535 |
| 2019/0052580 A1* | 2/2019 | Peng | H04L 47/825 |
| 2019/0158997 A1* | 5/2019 | Starsinic | H04L 47/2441 |

OTHER PUBLICATIONS

Miyasaka, T., "Analysis and Problem Statements for Interworking between 5G Network Slicing and Transport Network," draft-mink-5g-ns-transport-ps-00, Jun. 26, 2018, 16 pages.

Chunduri, U., "Preferred Path Routing for NGP and NG-Applications," Huawei R&D, USA, ETSI NGP#11, Cambridge, UK, XP14313465, Jun. 7, 2018, 19 pages.

* cited by examiner

INTEGRATED BACKHAUL TRANSPORT FOR 5GS

CROSS-REFERENCE TO RELATED APPLICATIONS

This patent application is a continuation of U.S. patent application Ser. No. 18/073,234 filed Dec. 1, 2022, which is a continuation of U.S. patent application Ser. No. 17/144,555, filed Jan. 8, 2021, now U.S. Pat. No. 11,546,793, which is a continuation of International Application No. PCT/US2019/041172, filed Jul. 10, 2019, which claims the benefit of U.S. Provisional Patent Application No. 62/696,214, filed Jul. 10, 2018, all of which are hereby incorporated by reference.

TECHNICAL FIELD

The present disclosure is generally related to device mobility in fifth generation radio access network (5G) networks, and is specifically related to managing traffic engineering (TE) by a 5G virtualized control plane.

BACKGROUND

Radio access networks (RANs) are implemented to allow cellular devices to move between base stations. Specifically, a cellular device may connect wirelessly to a base station. The cellular device can then establish a data connection with a network via the base station. The base station is generally selected from a group of base stations, where the selected base station has the best signal characteristics, for example based on distance between the base station and the cellular device, signal power of the base station, etc. As the cellular device moves, the signal characteristics may change. As such, the cellular device may connect to a new base station with the best signal characteristics. Various communication protocols can be employed to ensure data from the cellular device is forwarded to a destination, and vice versa.

SUMMARY

In an embodiment, the disclosure includes a method implemented in a network element (NE). The method comprises operating, by a processor of the NE, a transport network function (TNF) as part of a fifth generation wireless (5G) virtualized control plane. The method further comprises receiving, by the processor, a request to compute a traffic engineering (TE) path in a 5G transport network for a packet data unit (PDU) session, the request received from a 5G virtualized control plane function via a service based interface (SBI) bus. The method further comprises obtaining, by the processor, network topology information for the 5G transport network via a northbound interface (Nn). The method further comprises computing, by the processor, a TE path across the 5G transport network for the PDU session based on the network topology information. The method further comprises returning, by the processor, a TE path identifier for the TE path computed for the PDU session, the TE path identifier returned via the SBI bus. In some 5G systems, path routing is handled by protocols operating in the data plane (e.g., below the control plane). The present disclosure includes a TNF that performs path routing (e.g., path computation element (PCE) functionality). The TNF is positioned in the 5G control plane and on the SBI. This allows user plane functions (UPFs) to be assigned to a packet data unit (PDU) session based on TE conditions in the access network.

Optionally, in any of the preceding aspects, another implementation of the aspect provides, further comprising: provisioning, by a transmitter of the NE, the TE path and a transport virtual private network (VPN) across the 5G transport network, the provisioning performed via a southbound interface (Ns) between the TNF and the 5G transport network.

Optionally, in any of the preceding aspects, another implementation of the aspect provides, wherein the Ns extends between the TNF and a cell site router (CSR) associated with the PDU session.

Optionally, in any of the preceding aspects, another implementation of the aspect provides, wherein the Nn extends between the TNF and a UPF associated with the PDU session.

Optionally, in any of the preceding aspects, another implementation of the aspect provides, further comprising obtaining TE information for the 5G transport network via the Nn, wherein the TE path across the 5G transport network is computed based on the TE information.

Optionally, in any of the preceding aspects, another implementation of the aspect provides, wherein the request to compute the TE path is received in response to a user equipment (UE) mobility event at a 5G nodeB (gNB), and wherein a TE path identifier indicates a TE path for use by the UE to maintain the PDU session upon moving to the gNB.

Optionally, in any of the preceding aspects, another implementation of the aspect provides, wherein the request to compute the TE path is received from the gNB, an access management function (AMF), a network slice selection function (NSSF), a session management function (SMF), or combinations thereof, and wherein the TE path identifier for the TE path is returned to the gNB, the AMF, the NSSF, the SMF, or combinations thereof.

Optionally, in any of the preceding aspects, another implementation of the aspect provides, wherein a specific network slice selection assistance information (SNSSAI) of the PDU session is mapped to the transport VPN and TE path for a 5G network slice.

Optionally, in any of the preceding aspects, another implementation of the aspect provides, wherein the TE path across the 5G transport network is provisioned via the Ns based on preferred path routing (PPR) protocol by forwarding the TE path via the Ns to support maintenance of one or more PPR-identifiers (IDs) to control routing of PDU session packets traversing the 5G network slice.

In an embodiment, the disclosure includes a method comprising learning, by a TNF, TE characteristics of links and nodes in a 5G network via a Nn. The method further comprises receiving, by the TNF, a source address, a destination address, and required bandwidth for a PDU session via a SBI bus. The method further comprises provisioning, by the TNF, a VPN and TE path from a gNB to a UPF for the PDU session, the provisioning performed via a Ns. The method further comprises returning, by the TNF, a TE path identifier for the PDU session based on the source address, destination address, and required bandwidth. In some 5G systems, path routing is handled by protocols operating in the data plane (e.g., below the control plane). The present disclosure includes a TNF that performs path routing (e.g., PCE functionality). The TNF is positioned in the 5G control plane and on the SBI. This allows UPFs to be assigned to a PDU session based on TE conditions in the access network.

Optionally, in any of the preceding aspects, another implementation of the aspect provides, by the TNF, that transport network resources of the TE path match characteristics of the PDU session.

Optionally, in any of the preceding aspects, another implementation of the aspect provides, further comprising coordinating, by the TNF, with the gNB, an AMF, and a SMF to select transport resources for gNB selection during a UE mobility event.

Optionally, in any of the preceding aspects, another implementation of the aspect provides, wherein the Ns interacts between the TNF and the gNB or between the TNF and a CSR.

Optionally, in any of the preceding aspects, another implementation of the aspect provides, wherein the Nn communicates between the TNF and a branching point UPF or between the TNF and an anchor point UPF.

Optionally, in any of the preceding aspects, another implementation of the aspect provides, further comprising: mapping a SNSSAI of the PDU session to the VPN and TE path; and selecting, for uplink traffic in a 5G access network, a PPR-ID for the UPF according to the mapping based on the SNSSAI of the PDU session.

Optionally, in any of the preceding aspects, another implementation of the aspect provides, further comprising selecting, for downlink traffic in the 5G access network, a PPR-ID for the gNB according to the mapping based on the SNSSAI of the PDU session.

Optionally, in any of the preceding aspects, another implementation of the aspect provides, wherein the 5G access network is operating in session and service continuity (SSC) mode 1, such that an Internet Protocol (IP) address of the UE is preserved during mobility events, and wherein the method further comprises communicating, by the TNF, with a source gNB to confirm that transport path resources at a target gNB are available during UE mobility.

Optionally, in any of the preceding aspects, another implementation of the aspect provides, wherein the 5G access network is operating in SSC mode 2, such that the PDU session is released when an IP address of the UE is changed during mobility, and wherein no session continuity from the network is provided during mobility.

Optionally, in any of the preceding aspects, another implementation of the aspect provides, wherein the 5G access network is operating in SSC mode 3, such that a new IP address is assigned to the UE because the UE moved to another UPF coverage area, wherein a subsequent connection through a new PDU session anchor point is established before an initial connection is terminated. The method further comprises including, by a branching point UPF, an uplink packet onto a TE path to an anchor point UPF according to the mapping based on the SNSSAI of the PDU session. The method further comprises including, by the anchor point UPF, a downlink packet onto a TE path to the branching point UPF according to the mapping based on the SNSSAI of the PDU session.

In an embodiment, the disclosure includes a network element (NE) comprising a processor, a transmitter coupled to the processor, and a receiver coupled to the processor. The processor, transmitter, and receiver are configured to perform the method of any of the preceding aspects.

In an embodiment, the disclosure includes a non-transitory computer readable medium comprising a computer program product for use by a NE, the computer program product comprising computer executable instructions stored on the non-transitory computer readable medium such that when executed by a processor cause the NE to perform the method of any of the preceding aspects.

In an embodiment, the disclosure includes a NE comprising a TNF means for operating a TNF as part of a 5G virtualized control plane. The NE further comprises a computation request means for receiving a request to compute a TE path in a 5G transport network for a PDU session. The request is received from a 5G virtualized control plane function via a SBI bus. The NE further comprises a network topology means for obtaining network topology information for the 5G transport network via a Nn. The NE further comprises a TE means for computing a TE path across the 5G transport network for the PDU session based on the network topology information. The NE further comprises an output means for returning a TE path identifier for the TE path, the TE path identifier returned via the SBI bus.

Optionally, in any of the preceding aspects, another implementation of the aspect provides, wherein the NE is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
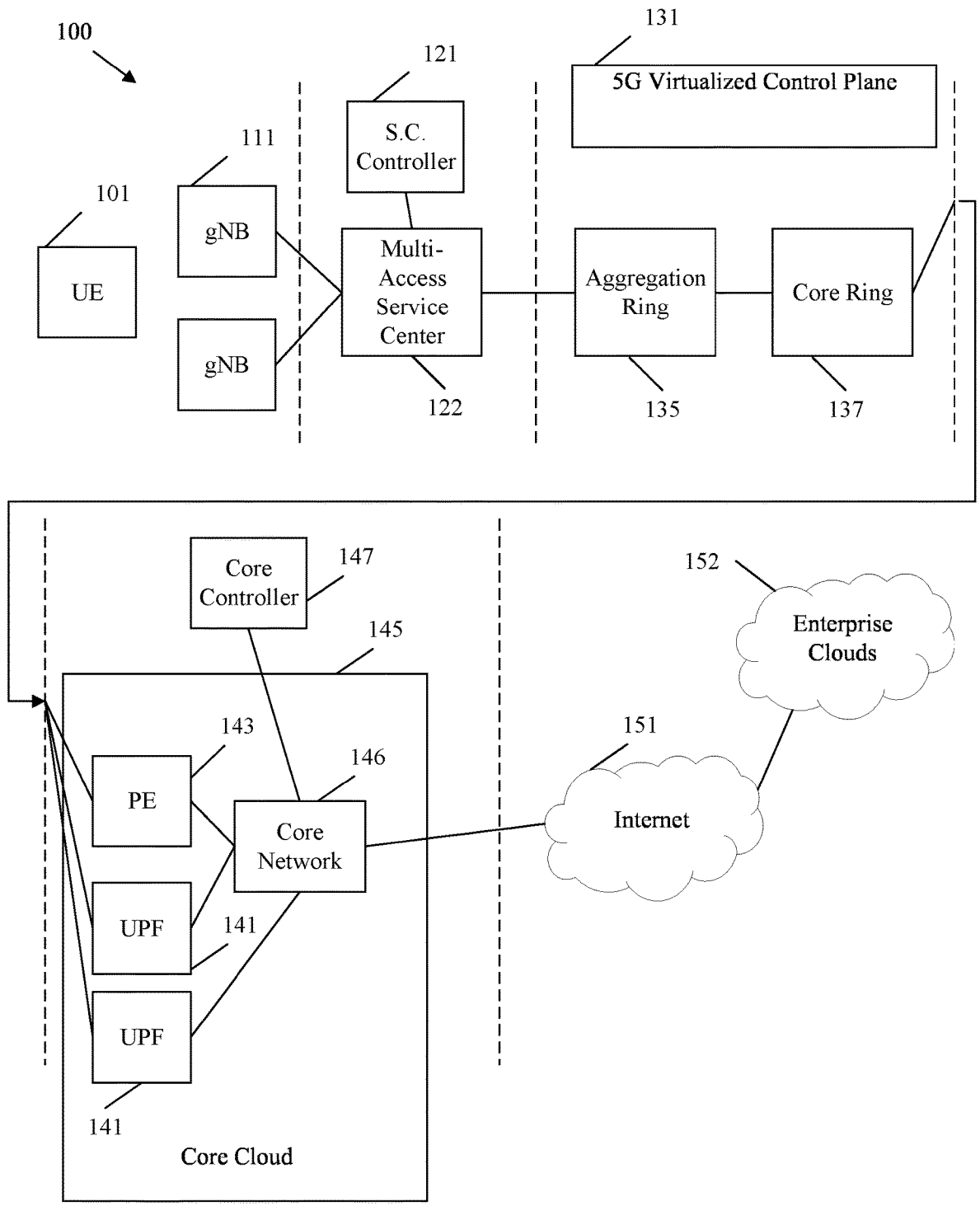
FIG. 1 is a schematic diagram of an example 5G network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following are definitions for several terms as used in the present disclosure. Fifth generation radio access network (5G) is a next generation set of network technology configured to manage data connections on behalf of mobile devices. User equipment (UE) is any of a broad category of mobile devices capable of performing wireless data communications. A data plane (DP), which can also be referred to as a user plane (UP), a forwarding plane, a carrier plane, and/or a bearer plane, is the part of a network that carries user traffic. The control plane (CP) is the part of the network that manages network topology and employs signaling to control the routing of user traffic as employed by the DP. A 5G network is implemented by a system of components known as a 5G system (5GS). A 5G Core (5GC) is a portion of a 5G network that connects a 5G access network to the Internet. A handover (HO) is a procedure of shifting UE wireless connectivity between base stations. Preferred path routing (PPR) is a protocol for routing packets whereby a single PPR identifier (PPR-ID) attached to a packet describes an entire path through a network. A transport network function (TNF) is a component positioned in a 5G virtualized control plane on a service based interface (SBI) bus, where the TNF is configured to compute and provision TE paths through the 5G network from the 5G virtualized control plane. Segment routing (SR) is a routing protocol that appends a header with a plurality of segments to a packet, where each segment identifies a path segment in order to manage routing functions at each node along the path through the network. A 5G base station (gNB) is a network device that acts as an anchor point for providing a UE communication access to a 5G network. Access and mobility management function (AMF) is a 5G technology in the CP that is configured to manage connection and mobility tasks for UEs that are wirelessly connected to a 5G network. Session management function (SMF) is a 5G technology in the CP configured to interact with the DP in order to control, maintain, and update communication sessions for UEs. A user plane function (UPF) is a 5G technology in the DP configured to manage routing and forwarding of UE traffic in a 5G network. A serving gateway (SGW) is a network device configured to perform routing and forwarding of UE traffic in a fourth generation radio access network (4G) network. A packet data network gateway (PGW) is a network device configured to perform policy enforcement, packet screening, and other security features for UE traffic in a 4G network. In 4G, the PGW and SGW are generally positioned on the same device. A significant change between 4G and 5G is the decoupling of SGW and the PGW, which results in a separate UPF and policy control function (PCF) that can be managed in different portions of the network. Other acronyms may include enhanced mobile broadband (cMBB), fast reroute (FRR), guaranteed bit rate (GBR), interior gateway protocol (IGP), loop free alternatives (LFA), massive internet of things (mIOT), Quality of Service (QOS), QoS flow identifier (QFI), pseudo wire (PW), segment identifier (SID), and/or Ultra reliable and low latency communications (URLLC).

5G networks employ a different architecture from 4G networks, which can provide for additional functionality. One of the innovations of the 5G network is the network slice. Generally, a network slice is a reserved set of resources and network topology for a communication session. Specifically, a network slice is a complete virtual network, operating over a shared network infrastructure, that provides communication, compute, and storage resources for a communication session. For example, a network slice may include a reserved path across the network, a reserved set of TE resources (e.g., reserved bandwidth, maximum latency, etc.), virtualized network functions (e.g., security functions, network address translation, etc.), reserved memory and processor hardware allocations, etc. Another innovation of the 5G network is the 5G virtualized control plane, which is a cloud based system configured to provide control functions for the 5G network. Such virtualization allows for control function mobility, for example by moving relevant control functions, or portions thereof, to positions that are in close proximity with the current location of a mobile UE (e.g., a cell phone, tablet computer, laptop, etc.) For example, 5G allows for UPF mobility in response to UE mobility. Such virtualization concepts allow for significant flexibility in optimizing the provisioning of network resources for corresponding communications.

Such configurability does provide certain challenges. For example, some 5G implementations employ the 5G virtualized control plane to select a network slice for a communication, but leave the provisioning of corresponding resources to network protocols operating in the RAN, the transport network, and the core network. In such implementations, the 5G virtualized control plane may not include mechanisms to ensure the service level agreement (SLA) guarantees promised to customers are actually being provided to the communication sessions of such customers. Managing such SLA guarantees in such implementations can be particularly challenging as the highly configurable nature of 5G allows for many different types of traffic with different resource needs (e.g., mission critical traffic, real time traffic, etc.) to occur from mobile devices that may experience handovers between gNBs. Further, such implementations do not consider the resources in the RAN, the transport network, and the core network in an integrated fashion, and hence may perform sub-optimal provisioning in some cases. In addition, multiple technologies are available for transport networks to employ in creating paths to use for transmitting packets as part of a packet data unit (PDU) session. As such, 5G virtualized control plane based mapping functions may have difficulty in mapping the network slice to the correct TE path resources in some cases.

Disclosed herein is a TNF positioned in the 5G virtualized control plane. The TNF is connected to the other 5G virtualized control plane based functions via a SBI bus. The TNF also includes a northbound interface (Nn) for receiving TE and topology information from the 5G network and a southbound interface (Ns) for performing network provisioning. Accordingly, the TNF can communicate with the rest of the 5G virtualized control plane via the SBI bus, and hence provide the 5G virtualized control plane with access to network resource information received from the Nn. Further, the TNF can provision network resources to be used as part of a network slice via the Ns. Also, the TNF can provide path identifier(s) to support mapping packets to the proper network slice. The result is a TNF that brings transport network topology, path computation, and TE management into the 5G virtualized control plane, which allows the transport network resources to be allocated in an integrated fashion with the RAN and the core network. Further, the TNF provides a mechanism to manage network slice resource allocation in the context of UE handovers, and hence allows for different management in different mobility scenarios. Also, the disclosed TNF may be configured to support PPR by providing PPR-IDs to relevant functions/devices to support uplink and downlink traffic mapping to corresponding slices. The TNF can also be used with other routing technologies, such as SR, resource reservation protocol for traffic engineering (RSVP-TE), and other routing protocols. These and other benefits of the TNF in the 5G virtualized control plane are discussed in greater detail below.

FIG. 1 is a schematic diagram of an example 5G network 100. The 5G network 100 is configured to provide data and/or voice connectivity to a UE 101. A UE 101 is any of a wide range of devices capable of wirelessly communicating data and/or voice over a network. For example, a UE 101 may include a cellular phone, a smart phone, a tablet computer, a personal computer, a laptop, an internet of things (IOT) device, etc.

The UE 101 wirelessly connects to the 5G network 100 via a gNB 111. A gNB 111 is a base station equipped to act as an access point for a UE 101 into the 5G network 100. A gNB 111 employs a downstream wireless interface for communicating with one or more UEs 101. While only one UE 101 is depicted, it should be noted that a gNB 111 may simultaneously communicate with multiple UEs 101. Compared with an evolved node B (eNB), the gNB 111 may communicate at higher frequencies and may have a shorter effective range in some cases. The gNB 111 may receive uplink packets from the UE 101 as well as transmit downlink packets to the UE 101 over a downstream wireless interface. A UE 101 may have access to multiple gNBs 111, and may employ a handover procedure to move connections between gNBs 111 based on distance, signal strength, available bandwidth, etc. The gNB 111 also includes an upstream interface for communicating with other devices in the network 100.

The gNBs 111 are coupled to a multi-access service center 122, which is controlled by a service center controller 121. Specifically, the multi-access service center 122 may couple to one or more gNBs 111 and provide services to any UE 101 that is wirelessly connected to such gNBs 111. The network 100 may include many multi-access service centers 122 placed in close proximity to the attached gNBs 111. The multi-access service center 122 may provide local caches and/or RAN functionality to support communications by the attached gNBs 111. The multi-access service center 122 may include servers, routers, memory caches, etc., which may be organized in a cloud model. Accordingly, the service center controller 121 may dynamically allocate various hardware components to perform various tasks for the attached gNBs 111.

The multi-access service centers 122 are connected to a core network 146 via one or more aggregation rings 135 and one or more core rings 137. The aggregation rings 135 each include a plurality of interconnected routers capable of combining the connections from the multi-access service centers 122 for communication with the upstream portions of the network 100. The core rings 137 include a plurality of interconnected routers capable of combining the connections from one or more aggregation rings 135 into the core network 146. In this way, an arbitrary large number of gNBs 111 placed in many different locations can be interconnected, and corresponding communications can be aggregated, for input into the core network 146 in the upstream direction and for receiving output from the core network 146 in the downstream direction.

The routing between the multi-access service centers 122 and the core network 146 (e.g., the transport network) can be controlled by a 5G virtualized control plane 131 (e.g., in addition to other functionality of the 5G virtualized control plane 131). For example, the 5G virtualized control plane 131 can, among other things, determine how routing and other control functions should occur and communicate such decisions to the data plane. The data plane then carries out those instructions. The data plane may include the routers and/or routing functions in the aggregation rings 135 and the core rings 137. In some instances, the 5G virtualized control plane 131 may also manage data plane functions by routers/routing functions in the multi-access service centers 122 and a core cloud 145. For example, the 5G virtualized control plane 131 may be implemented on the service center controller 121, a core controller 147, various controllers for the aggregation ring 135 and core ring 137, or combinations thereof. The 5G virtualized control plane 131 includes a plurality of virtualized functions, and hence may be implemented by dynamically allocating hardware resources across a plurality of controllers, servers, or other compute capable network nodes. The 5G virtualized control plane 131 comprises many functions as defined by the 3rd Generation Partnership Project (3GPP). For example, the 5G virtualized control plane 131 provides various services for the UE 101, as well as other network nodes, and hence provides the overall management functions that inform such nodes how communications over the network 100 should occur.

The core ring 137 is coupled to a core cloud 145 and a core controller 147. The core cloud 145 is controlled by the core controller 147. The core cloud 145 and core controller 147 collectively provide virtualized network edge services for the network 100. For example, the core cloud 145 may include a plurality of servers, routers, switches, etc. coupled together according to a cloud computing model. Such devices, or portions thereof, can be categorized as memory resources, network resources, processing/compute resources, etc. The core controller 147 comprises a network node with at least communication and processing capabilities. The core controller 147 is configured to monitor the status of the core cloud 145 and elastically/dynamically assign resources from the core cloud 145 to perform requested tasks. Such tasks include network edge services. A network edge service is any task applied at an entry point and/or exit point to the core network 146. Such tasks may include network security, firewalls, parental control, device authentication, policy enforcement, caching, content data network (CDN), charging and analytics, etc. Further, latency sensitive tasks may be performed in the core cloud 145, as this approach positions corresponding services closer to the end user (e.g., the UE 101) than performing such tasks in an enterprise cloud 152. For example, latency sensitive tasks may include emergency response systems, online gaming systems, virtual reality systems, autonomous vehicle control systems, certain IoT applications, or other tasks where response time is critical to the preferred functionality of the system provided to the end user. Accordingly, the core cloud 145 may provide low latency services to the UE 101, based on an allocation by the core controller 147, and or provide the UE 101 with access to the Internet 151.

The core cloud 145 includes the core network 146, which is an interconnected group of routers, switches, firewalls, and other network equipment that connects downstream components to the Internet 151. The core cloud 145 also includes one or more user plane functions (UPFs) 141 and/or provider edge (PEs) 143. A UPF 141 is function operating in the data plane that manages routing and forwarding of UE 101 traffic to the network 100. A PE 143 is a gateway device into a provider network, such as a core network 146. The UPF 141 and the PE 143 may operate together to perform similar functions to a SGW in a 4G network. However, the UPF 141 is virtualized and may be decoupled from policy enforcement and may operate as a virtual machine/function allocated over multiple physical devices. Specifically, the PE 143 may act as an end point for traffic engineering (TE) paths across the transport network. Hence, the PE 143 may receive uplink packets from the UE 101 and forward such packets to a corresponding UPF 141 instance. The UPF 141 may then route such packets over the Internet 151 via the core network 146. Further, the UPF 141 may receive downlink packets from the Internet 151 via the core network 146. The UPF 141 may then route such downlink packets to the PE 143, which can then route the downlink packets to the appropriate UE 101 at the appropriate gNB 111. While the UPF 141 is depicted as residing in the core cloud 145, it should be noted that the virtualized nature of the UPF 141 also allows the UPF 141 to be implemented in whole or in part in the access network (e.g., the multi-access service center 122) and/or the aggregation network (e.g., in the aggregation ring 135 and/or core ring 137). Further, some implementations combine the PE 143 functionality and the UPF 141 functionality into a single integrated component (e.g. denoted as a UPF).

The Internet 151 couples the core cloud 145 to many enterprise clouds 152. An enterprise cloud 152 is a cloud network comprising routers, servers, switches, etc. organized according to cloud networking principles. An enterprise cloud 152 may include various virtual machines or other servers configured to host services that respond to requests for data from the UE 101. For purposes of discussion, a node that communicates with a UE 101 may be referred to as a correspondent node. A correspondent node for the UE 101 may reside in an enterprise cloud 152 as a virtual machine, a dedicated server, etc. In some cases, a correspondent node may also be a different UE 101 connected to a different access network, for example via a gNB 111.

Figure 2:
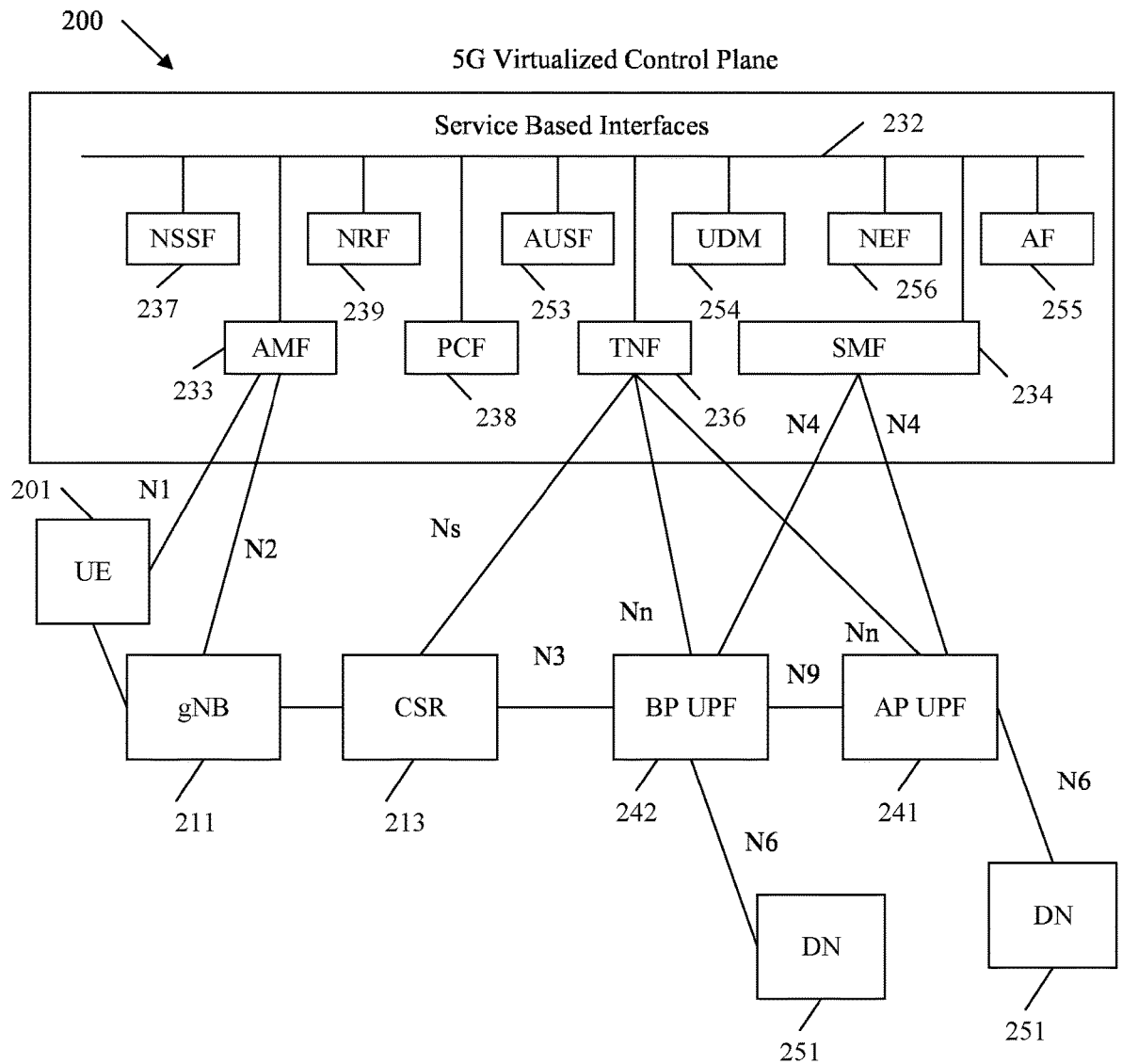
FIG. 2 is a schematic diagram of an example 5G virtualized control plane.

FIG. 2 is a schematic diagram of an example 5G virtualized control plane 200, which may be employed as an implementation of a 5G virtualized control plane 131 as described in FIG. 1. The 5G virtualized control plane 200 manages various network equipment in a data plane. The data plane equipment is tasked with communicating data (e.g., network packets) based on instructions from the 5G virtualized control plane 131. The data plane equipment includes a UE 201 and a gNB 211, which may be substantially similar to UE 101 and gNB 111, respectively.

The data plane equipment may also include a cell site router (CSR) 213. A CSR 213 is a router coupled to a gNB 211. In some examples, the CSR 213 performs multi-service support for communications traversing the gNB 211, such as proving Internet Protocol (IP) routing services, time division multiplexing (TDM), operations administration and management (OAM), link aggregation, and protection switching. The CSR 213 may be a separate component as shown, or the functionality of the CSR 213 can be integrated into the gNB 211 in some examples. The CSR 213 and/or the gNB 211 can communicate with the current UPF via a third interface (N3).

The data plane equipment may also include a branch point (BP) UPF 242 and/or an anchor point (AP) UPF 241, which are similar to UPFs 141. The AP UPF 141 and BP UPF 242 act as anchors for the UE 201 from an IP address standpoint, and hence perform routing and forwarding functions for the UE 201. For example, the AP UPF 141 can act solely as UPF for anchoring a PDU session. The BP UPF 242, also referred to as an intermediate UPF (I-UPF) in some cases, may be employed in multi-homed scenarios. As discussed in more detail below, a network can handle UE 201 mobility in several different session and service continuity (SSC) modes. In SSC mode 3, the UE 201 is assigned a new IP address during a handover between a source and destination gNB 211. In such a case, the source gNB 211 is associated with a source UPF which acts as an anchor point for an initial IP address. When the UE 201 is handed over to the destination gNB 211, the source UPF becomes a BP UPF 242 for anchoring the initial IP address. A subsequent IP address is also assigned to the UE 201 during the handover, and the AP UPF 241 acts as an anchor point for the subsequent IP address. Hence, during the handover, the UE 201 is anchored to both the BP UPF 242 and the AP UPF 241 via different IP addresses. This scenario is referred to as a multi-homed session. The BP UPF 242 and the AP UPF 241 can communicate via a ninth interface (N9). Once the handover is complete, BP UPF 242 and associated IP address can be released.

The data plane can also include various data networks (DNs) 251 which may be similar to Internet 151 and/or enterprise clouds 152. Hence, the DNs 251 may contain a correspondent node communicating with the UE 201. The current UPF (e.g., BP UPF 242 and/or AP UPF 241) can communicate with the DN 251 via a sixth interface (N6).

The 5G virtualized control plane 200 controls the communication session(s) between the UE 201 and the DN(s) 251 by controlling the forwarding behavior of UE 201, gNB 211, CSR 213, BP UPF 242, and/or AP UPF 241. The 5G virtualized control plane 200 includes a service based interface (SBI) bus 232, which is a set of hardware and software communication resources allocated to transfer information between the components of the 5G virtualized control plane 200. The SBI bus 232 also allows services to be advertised and/or consumed between the virtualized network functions. The 5G virtualized control plane 200 includes a network slice selection function (NSSF) 237, an access and mobility management function (AMF) 233, a Network Repository Function (NRF) 239, a Policy Control Function (PCF) 238, an Authentication Server Function (AUSF) 253, a TNF 236, a Unified Data Management (UDM) 254, a Network Exposure Function (NEF) 256, a session management function (SMF) 234, and an Application Function (AF) 255, which are interconnected by the SBI bus 232. It should be noted that the preceding list is exemplary and not intended to be exhaustive.

The NSSF 237 supports creating and/or providing the UE 201 access to relevant slices of the network, and may also assign an AMF 233 to the UE 201. As noted above, a network slice is a virtual network implemented on a shared network infrastructure, and hence the NSSF 237 creates and/or provides access to slices for transporting data between the UE 201 and a correspondent node in a DN 251. The AMF 233 performs authentication, connection management, security context management, registration, and mobility management for UE 201. The AMF 233 can communicate with UE 201 via a first interface (N1) and with the gNB 211 via a second interface (N2). The NRF 239 supports network discovery. Specifically, the NRF 239 receives network discovery requests, determines relevant network function instances, and provides related data. The PCF 238 provides policy rules to other control plane functions to support enforcement of such policy rules. The AUSF 253 performs authentication functions to provide authenticated devices (e.g., UE 201) and untrusted devices an appropriate level of access to the network. The UDM 254 generates authentication credentials, manages user identification handling, manages subscriptions, supports service and session continuity by supporting assignments of ongoing sessions, and performs other functions related to subscription data. The NEF 256 is an interface for external applications and provides secure and controlled access to network functions, network analytics, and other private network information, for example by masking and translating secure network data into a form that is not secure/sensitive. The SMF 234 manages communication sessions for the UE 201, for example by managing addresses, performing traffic steering, establishing/terminating sessions, and providing corresponding notifications. The SMF 234 can communicate with the BP UPF 242 and/or the AP UPF 241 via a fourth interface (N4). The AF 255 interacts with the core network to provide external applications secure access to influence traffic routing, to the NEF 256, and to the network policy framework to support policy control at the PCF 238. As noted above, the 5G virtualized control plane 200 provides these services as well as others for the UE 201, and hence provides the overall management functions that inform the UE 201, as well as other network nodes, how communication with the network should occur.

The 5G virtualized control plane 200 of the present disclosure also includes a TNF 236, which is provided to address various concerns mentioned above. For example, the TNF 236 may provide the 5G virtualized control plane 200 with direct access to resources in the transport network (e.g., the multi-access service center 122, the aggregation ring 135, the core ring 137, etc.) to allow the 5G virtualized control plane 200 to further optimize provisioning based on transport network status as well as to ensure SLA guarantees are provided to communications. The TNF 236 is connected to the other 5G virtualized control plane 200 based functions via the SBI bus 232. The TNF 236 includes a Nn for receiving TE and topology information from the network. For example, the Nn may include a set of communication resources allocated between the TNF 236 and the current UPF (e.g., BP UPF 242 and/or AP UPF 241). Hence, the TNF 236 can employ the Nn to communicate with the UPF 241 and/or 242 to determine current network resource availability as well as network topology. The TNF 236 also includes a Ns for performing network provisioning. The Ns may include a set of communication resources allocated between the TNF 236 and the CSR 213 and/or other routers in the access network. For example, the TNF 236 can provision network resources be sending such provisioning to the CSR 213, which can be configured to forward such provisioning across the network.

The TNF 236 can communicate with the rest of the 5G virtualized control plane 200 via the SBI bus 232, and hence can provide the 5G virtualized control plane 200 with access to network resource information received from the Nn. Further, the TNF 236 can provision network resources to be used as part of a network slice via the Ns. For example, the TNF 236 can receive an access request for the UE 201 from the NSSF 237 and/or the AMF 233 via the SBI bus 232. The TNF 236 can obtain topology and TE information from the Nn and perform path computations. The TNF 236 can then provision resources for the UE 201 via Ns based on the results of the path computation. Such provisioned resources can make up the network slice to be used by the UE 201. The TNF 236 can also provide path identifiers to support mapping the network resources to the slice and/or associated identifiers, for example to the NSSF 237 and/or the AMF 233 via the SBI bus 232 and/or to the CSR 213 via the Ns. The identifiers and/or corresponding mappings can then support mapping packets to the proper network slice during communication. The result is a TNF 236 that brings transport network topology, path computation, and TE management into the 5G virtualized control plane 200. This in turn allows transport network resources to be allocated in an integrated fashion with the RAN and the core network. Further, the TNF 236 provides a mechanism to manage network slice resource allocation in the context of UE 201 handovers, and hence allows for different management in different mobility scenarios. Also, the disclosed TNF 236 may be configured to support PPR across a network slice (e.g., between a gNB 211 and an AP UPF 241) by providing PPR-IDs to relevant functions/devices to support uplink and downlink traffic mapping to corresponding slices. The TNF 236 can also be used with other routing technologies, such as SR, RSVP-TE, and other routing protocols.

Figure 3:
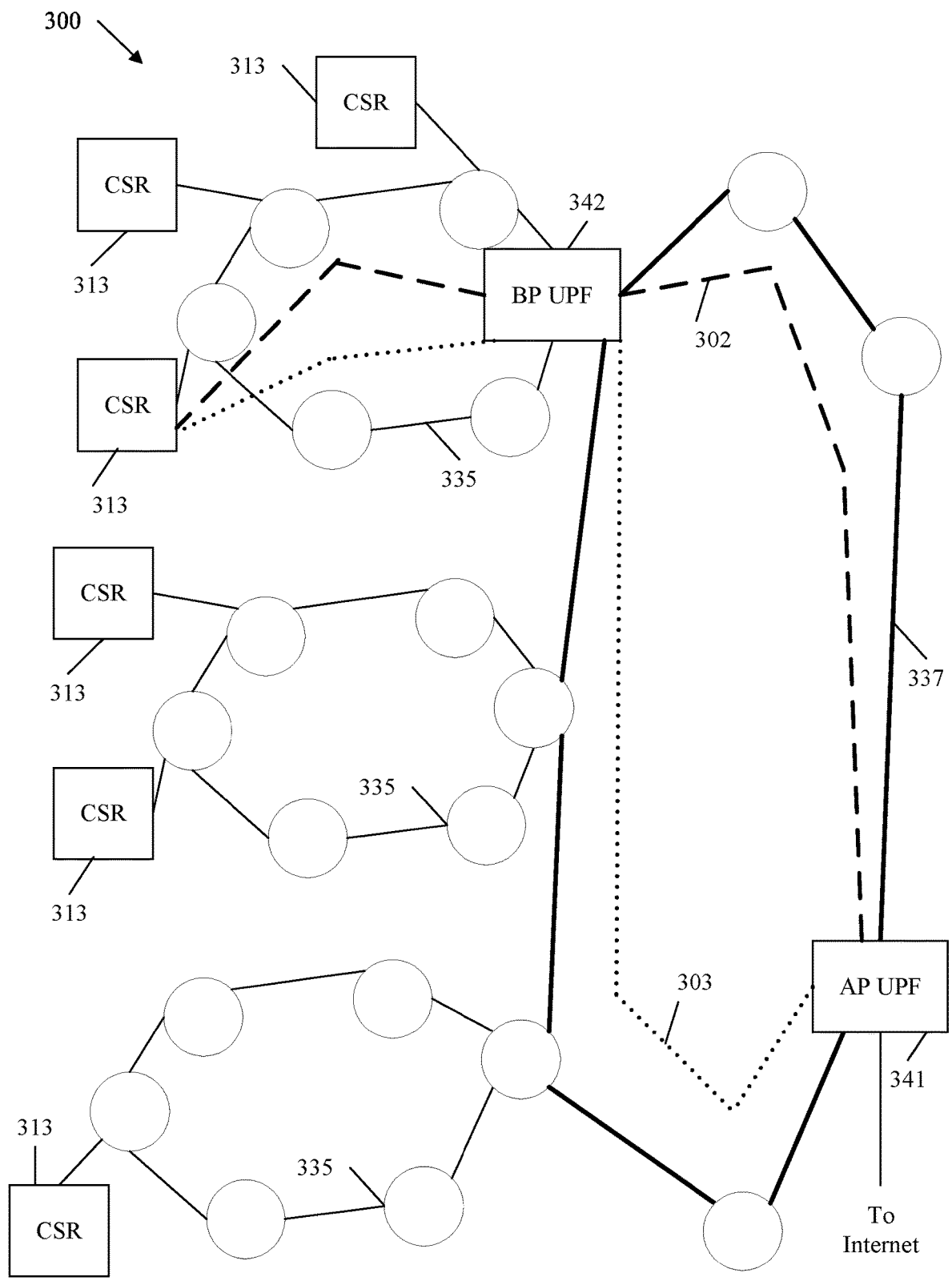
FIG. 3 is a schematic diagram that illustrates example communications over a 5G transport network employing slicing.

FIG. 3 is a schematic diagram that illustrates example communications over a 5G transport network 300 employing slicing. For example, the 5G transport network 300 can be controlled by a 5G virtualized control plane 200. Further, the 5G transport network 300 can implement portions of a network 100.

The 5G transport network 300 is coupled to a plurality of CSRs 313. Such CSRs 313 may be substantially similar to CSR 213, and may couple corresponding gNBs to the network 300. The 5G transport network 300 also includes a plurality of aggregation rings 335 and a core ring 337, which may be substantially similar to aggregation rings 135 and core ring 137, respectively. The aggregation rings 335 each contain a plurality of routers in a ring structure that couple to a plurality of CSRs 313, and hence aggregate traffic from the corresponding gNBs. The aggregation rings 335 are coupled to the core ring 337. Hence, any CSR 313 can communicate with the core ring 337 via a corresponding aggregation ring 335. The core ring 337 can forward such communications to correspondent node(s) in a data network.

The 5G transport network 300 also employs UPFs, in this case positioned in the core ring 337. In the example shown, a BP UPF 342 and an AP UPF 341 are located at various points in the core ring 337. The BP UPF 342 and AP UPF 341 may be substantially similar to BP UPF 242 and AP UPF 241, respectively. For example, the BP UPF 342 and AP UPF 341 may be employed in a multi-homed scenario where a UE is in the process of moving between gNBs associated with different aggregation rings 335. It should also be noted that the UPFs may also be associated with PEs. Accordingly, a BP UPF 342 can act as a combined PE-BP UPF. Further, an AP UPF 341 can act as a combined PE-AP-UPF. The PE and the UPF 341 and/or 342 can be implemented in the same device or in separate devices. In either case, the PE manages transport tunnel related functionality, while the UPF 341 and/or 342 handles 5G payload data plane processing.

The 5G transport network 300 also includes an example uplink slice 302 and a downlink slice 303, depicted as a dashed line and dotted line, respectively. The uplink slice 302 is a provisioned virtual network for carrying uplink packets upstream, and the downlink slice 303 is a provisioned virtual network for carrying downlink packets downstream. A TNF, NSSF, an AMF, and/or a SMF, such as the TNF 236, NSSF 237, AMF 233 and/or a SMF 234 from the 5G virtualized control plane 200, may work together to create and manage such slices 302 and 303 both during steady state communication and during mobility events. As a specific example, a UE may initially be attached to the BP UPF 342. The TNF 236 may determine path(s) between the UE and the BP UPF 342 via Nn, for example based on a request from the NSSF and/or AMF. The TNF may also provision the path(s) via Nn. The TNF can then return an identifier that identifies the allocated path associated with the correct slice. For example, the TNF can return the identifier to the NSSF and/or AMF to support mapping. The TNF may also provision the identifier to the relevant CSR 313 for propagation through the network 5G transport network 300. For example, in a PPR context, a single PPR-ID can be used to denote the slice 302 and/or 303. The PPR-ID can be installed in the CSR 313 and propagated across path(s) via the Ns. The NSSF can employ the PPR-ID to perform slice mapping and/or complete allocation of resources to the slice 302 and/or 303. Other IDs and/or mappings can also be used for other protocols to a similar effect (e.g., SR, RSVP-TE, etc.). The CSR 313 and the relevant UPF (e.g., the BP UPF 342) can then attach the relevant ID(s) to the packets to ensure the packets are routed to the appropriate upstream slice 302 and/or downstream slice 303, respectively. In the example discussed, mobility has not yet occurred, so the UPF denoted as BP UPF 342 is still acting as an anchor point. Hence, the upstream slice 302 and downstream slice 303 initially extend from the CSR 313 to the BP UPF 342, and the BP UPF 342 routes the packets to and from the Internet.

The control plane can also be employed to respond to mobility events. For example, mobility can be handled in SSC mode1, SSC mode2, and/or SSC mode3. In SSC mode1, the UE moves between CSRs 313 but remains in a region controlled by the same UPF (in this case the BP UPF 342). In this case, the IP address of the UE is preserved and the BP UPF 342 would continue to serve as the anchor point. In SSC mode2 the UE moves between CSRs 313 to an area controlled by AP UPF 341 and receives a new IP address. However, in SSC mode2 session continuity is not employed. This may be acceptable for non-critical communications. In such a case, the slices between the source CSR 313 and BP UPF 342 are released and new slices are allocated between the destination CSR 313 and the AP UPF 341.

SSC mode3 is the mode depicted in FIG. 3. In SSC mode3, multi-homing is employed to ensure session continuity. Upon receiving notification of the mobility event via the SBI bus (e.g., from the AMF), the TNF can compute paths between the BP UPF 342 and the AP UPF 341, and provision such paths via the Ns. In other examples, the SMF can instead include forwarding rules in the BP UPF 342 and the AP UPF 341. The result is the creation of upstream slice 302 and downstream slice 303. In this way, the initial session can be maintained to route packets between the source gNB/CSR 313 to the newly assigned AP UPF 341. Once the handover is complete and the UE is communicating completely through the APF UPF 341 via the new IP address, the upstream slice 302 and downstream slice 303 can be torn down. It should be noted that ensuring the BP UPF 342 and the AP UPF 341 (as well as other UPFs) employ similar Reflective Quality of Service Indicator (RQI) values for corresponding slices supports seamless mobility as described above and causes UPF to give similar treatment to all of the packets.

While the TNF can interact with many protocols to implement upstream slice 302 and downstream slice 303, the present disclosure focuses on PPR as an example. For example, PPR provides a mechanism for creating a TE Path regardless of the underlay used by the network. An underlay is a routing technology, and may include segment routing multiprotocol label switching (SR-MPLS), Internet Protocol version 6 (IPv6), segment routing over IPv6 (SRv6), IPv4, etc. PPR may provide low transport path overhead and TE characteristics with specified bandwidth, latency, and jitter, which can be signaled along the path. Further, PPR can be supported with any native IP data plane (IPv4 and IPv6), without employing hardware upgrades in the network (other than potentially TE support). Further, different PPR-IDs can be signaled for different slice/service types (SSTs) and can be signaled from any node in the network. For the example, an uplink gNB/CSR 313 can choose the correct PPR-ID of the UPF to route over the upstream slice 302 based on the 5G QoS indicator (5QI) value and/or RQI associated with the slice (e.g., by the NSSF). Similarly, the correct PPR-ID of the current gNB is chosen in the downlink direction to employ downstream slice 303.

For example, PPR can be used on the N9 interface, which is the set of nodes between the BP UPF 342 and the AP UPF 341. In the uplink direction for the traffic offloading case, PPR can ensure uplink packets reach to the correct exit UPF, which is BP UPF 342 before the handover and the AP UPF 341 after the handover. This can be accomplished when the corresponding CSR 313 or BP UPF 342 follows slice guidance from the NSSF and/or TNF and inserts the correct 5QI, depending on the example. Further, the CSR 313 or BP UPF 342 inserts uplink classifier (ULCL) meta data. A mapping of the PDU session source IP to the correct exit UPF is also accomplished (e.g., by the AMF/SMF) to select the outgoing UPF. Further, the BP UPF 342 should place the packet should be on the correct virtual private network (VPN) and pathway to reach the correct exit node e.g., the AP UPF 341, as well as select the corresponding PPR-ID of the AP UPF 341.

In the downlink direction from the incoming AP UPF 341, the corresponding packet should reach the BP UPF 342. The AP UPF 341 should insert the correct break point information to reach BP UPF 342 for the corresponding slice. The AP UPF 341 should also perform the proper mapping of destination IP to BP UPF 342, for example based on slice/RQI. In addition, the downlink slice 303 should be started to the correct gNB with the correct pathway, the correct RQI, and the correct PPR-ID of the source gNB. It is possible to have a single PPR-ID for multiple input points through a PPR tree structure. Further, PPR can support mobility when the same set of PPRs are created uniformly across all relevant gNBs and UPFs. It should be noted that the TNF may be responsible for managing the updates of TE parameters of the path, replacement path, and deleted path during mobility. The TNF can also push such information to the NSSF, AMF and SMF via the SBI bus as desired.

The TNF can also supply a particular RSVP-TE path and/or SR path to the NSSF, AMF, and/or SMF. RSVP-TE provides a lean transport overhead for the TE path. To support RSVP-TE the TNF may have to provision across all the nodes in the path (e.g., all the nodes associated with the N3 and N9 interfaces). SR-TE can also be used because SR-TE allows path steering for any flow at the ingress and allows particular paths for a flow to be chosen.

Figure 4:
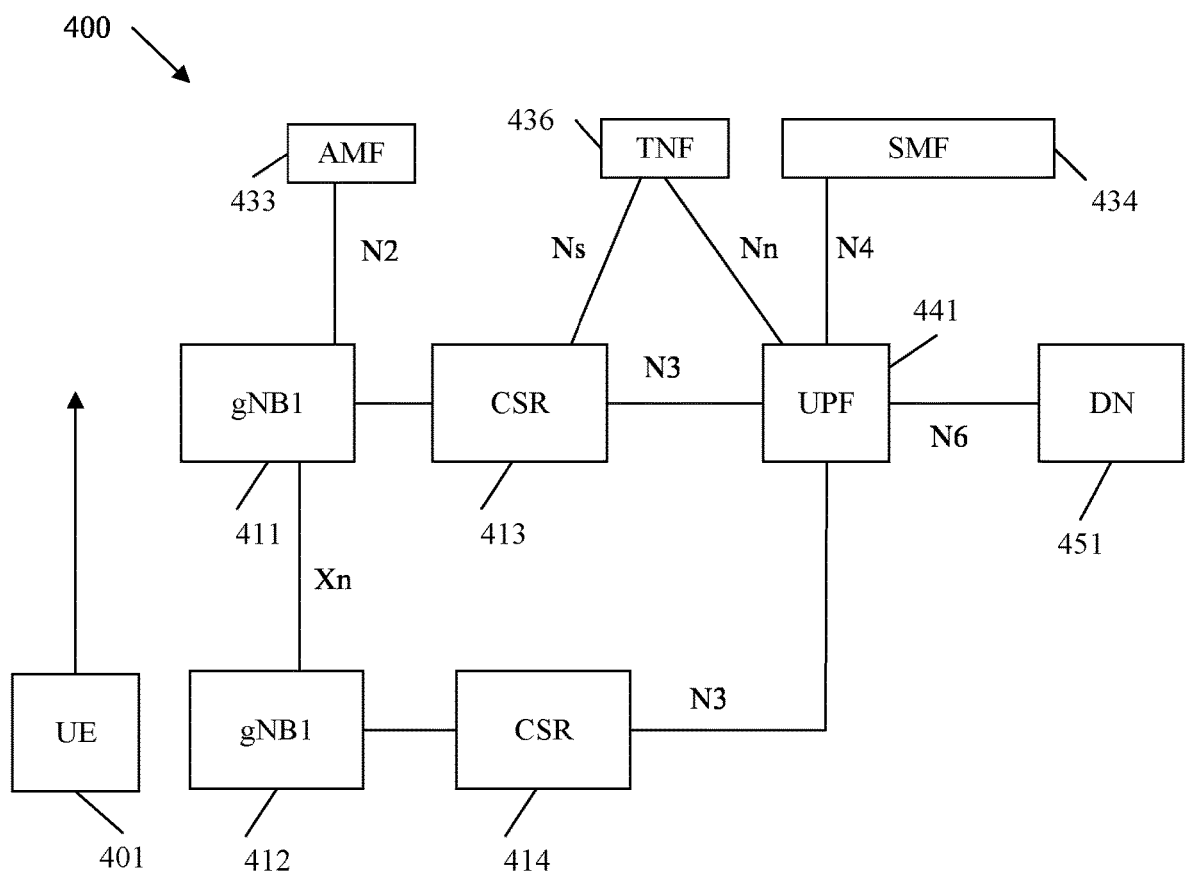
FIG. 4 is a schematic diagram that illustrates an example handover in a 5G network.

FIG. 4 is a schematic diagram that illustrates an example handover in a 5G network 400, which may be substantially similar to 5G network 100 and/or 5G transport network 300, and may be controlled by a 5G virtualized control plane such as 5G virtualized control plane 200. 5G network 400 further illustrates handovers performed in SSC mode1 and SSC mode2. The 5G network 400 includes a UE 401, destination and source gNBs 411 and 412, destination and source CSRs 413 and 414, UPF 441, and DN 451, which may be substantially similar to UE 201, gNB 211, CSR 213, AP UPF 241, and DN 251, respectively. The 5G network 400 is controlled by a 5G virtualized control plane including an AMF 433, a TNF 436, and a SMF 434, which may be substantially similar to AMF 233, TNF 236, and SMF 234, respectively.

As discussed above, in SSC mode1, no new IP address is assigned to the UE 401 when the UE 401 moves from the source gNB 411 to the destination gNB 412. In SSC mode2, a new IP address is assigned to the UE 401 upon handover, but session continuity is not maintained (e.g., communications are interrupted and reestablished.) In either case, multi-homing is not performed. Accordingly, 5G network 400 employs a single UPF 441 that acts as an anchor point rather than having both an AP UPF and a BP UPF.

The AMF 433 communicates with the source and destination gNBs 412 and 411 via interface N2. The source and destination gNBs 412 and 411 can communicate via a inter base station (Xn) interface. The slice between a CSR (e.g., the destination CSR 413) and the UPF 441 is the N3 interface. The TNF 436 communicates with the destination CSR 413, the UPF 441, and/or any intervening nodes with the Nn and Ns interface. The SMF 434 communicates with the UPF 441 via the N4 interface. The UPF 441 communicates with the DN 451 via the N6 interface.

Prior to the handover, the TNF 436 computes and provisions the initial path across the N3 interface via the Nn and Ns interface and provides relevant identifiers to the source CSR 414, the UPF 441, and/or the control plane to allow the correct slice to be selected in the uplink direction by the source CSR 414 and the downlink direction by the UPF 441. Upon handover, the TNF 436 computes and provisions the subsequent path across the N3 interface via the Nn and Ns interface and provides relevant identifiers to the CSR 413, the UPF 441, and/or the control plane to allow the correct slice to be selected in the uplink direction by the destination CSR 413 and the downlink direction by the UPF 441.

Accordingly, in SSC mode1, the IP address at the UE 401 is preserved in a manner similar to 4G mechanisms, and the respective slice PPR-ID is assigned based on uplink and downlink direction. During Xn mobility between the source and destination gNBs 412 and 411, the AMF 433 ensures the respective transport resources indicated by TNF 436 are available at the target gNB (e.g., the destination gNB 411). In SSC mode2 the IP address of the UE 401 can change during mobility, and the corresponding PDU session is released. There is no session continuity from the network 400 in this mode, which offloads such continuity to the application that is communicating the data to manage the session continuity. For PDU Sessions, the service, request, and mobility mechanisms to select the transport resources and appropriate PDU sessions are similar to SCC mode1.

Figure 5:
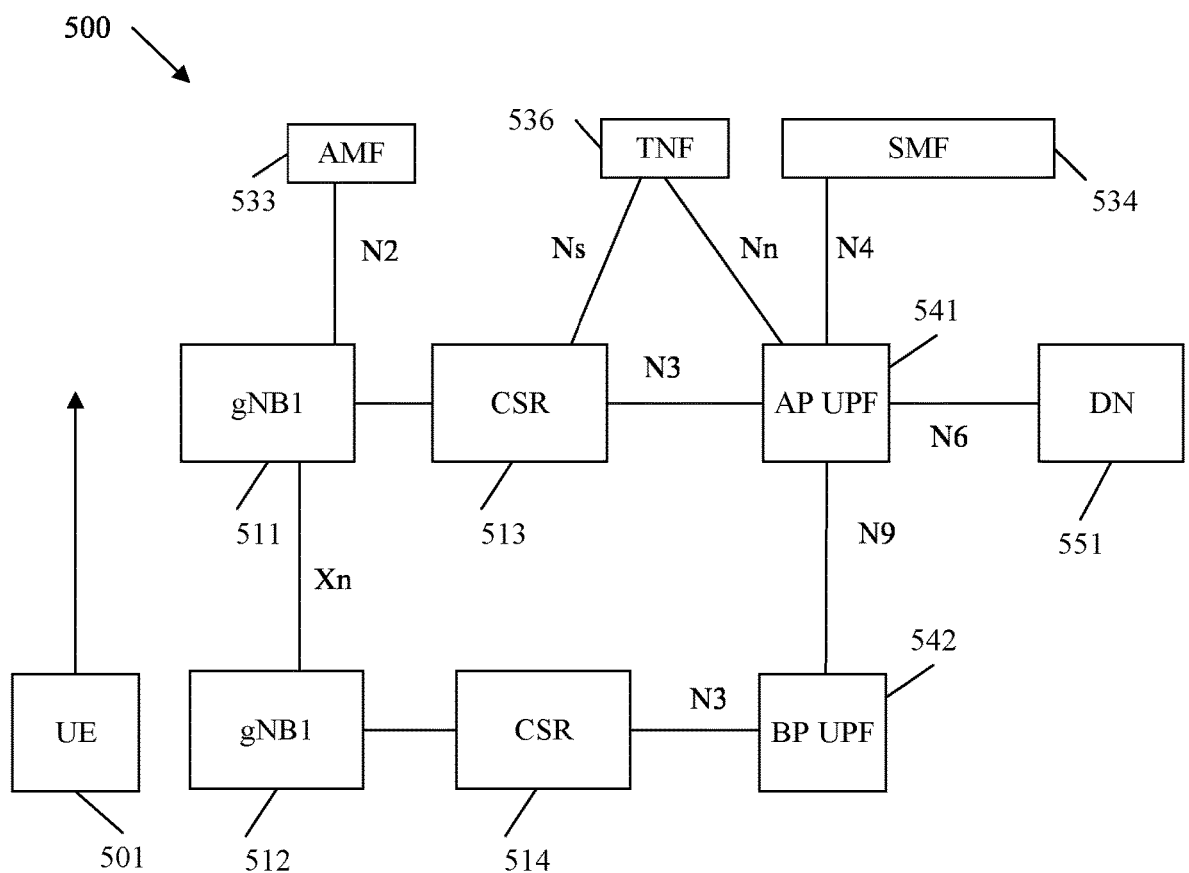
FIG. 5 is a schematic diagram that illustrates an example handover in a 5G network using a multi-homing.

FIG. 5 is a schematic diagram that illustrates an example handover in a 5G network 500 using multi-homing. The 5G network 500 is substantially similar to 5G network 400, but is illustrated as operating in SSC mode3. The 5G network 500 includes a UE 501, a destination gNB 511, a source gNB 512, a destination CSR 513, a source CSR 514, a DN 551, an AMF 533, a TNF 536, and a SMF 534, which may be substantially similar to UE 401, destination gNB 411, source gNB 412, destination CSR 413, source CSR 414, DN 451, AMF 433, TNF 436, and SMF 434, respectively. As the 5G network 500 is configured for multi-homing, the 5G network 500 includes a BP UPF 542 and an AP UPF 541, which are both similar to UPF 441. However, the BP UPF 542 anchors the initial/source IP address of the UE 501 and the AP UPF 541 anchors the subsequent/destination IP address of the UE 501 after the handover. The interfaces of 5G network 500 are substantially similar to the interfaces of 5G network 400, but 5G network 500 also includes an N9 interface between the BP UPF 542 and the AP UPF 541.

Prior to the handover, the slices in the N3 interface between the source CSR 514 and the BP UPF 542 are computed and provisioned as discussed in 5G network 400. Upon handover, the slices in the N3 interface between the destination CSR 513 and the AP UPF 541 are computed and provisioned as discussed in 5G network 400. In order to ensure session continuity, the TNF 536 also computes and provisions a path across the N9 interface via the Nn and Ns interface and provides relevant identifiers to the destination CSR 513, the BP UPF 542, the AP UPF 541, and/or the control plane to allow the correct slice to be selected in the uplink direction by the BP UPF 542 and the downlink direction by the AP UPF 541. In this way, the initial session is maintained and routed from the previous BP UPF 542 to the subsequent AP UPF 541, and vice versa.

Specifically, in SSC mode3, changes to user plane are made visible to UE 501. Also, a new IP address may be assigned to the UE 501. The 5G network 500 also ensures UE 501 suffers no loss of connectivity. A connection through a new PDU session anchor point (the AP UPF 541) is established before the connection is terminated through the previous anchor point (BP UPF 542) for better service continuity. Slice routing in SSC mode3 can be managed by maintaining a single PDU session or by creating different PDU sessions. The SSC mode3 parameters can be specified and/or set as defaults by SMF 534. There may be no change in the mode once the connection is initiated. The respective PPR-ID on N3 and N9 is selected with the correct transport characteristics by the TNF 536. For N2 based mobility the AMF 533 and/or SMF 534 should ensure transport resources are available for the N3 interface to new ULCL and from there the BP UPF 542. For service continuity with multi-homed PDU sessions, the same transport network characteristics of the original PDU session (both on N3 and N9) should be observed when creating the new PDU session.

Figure 6:
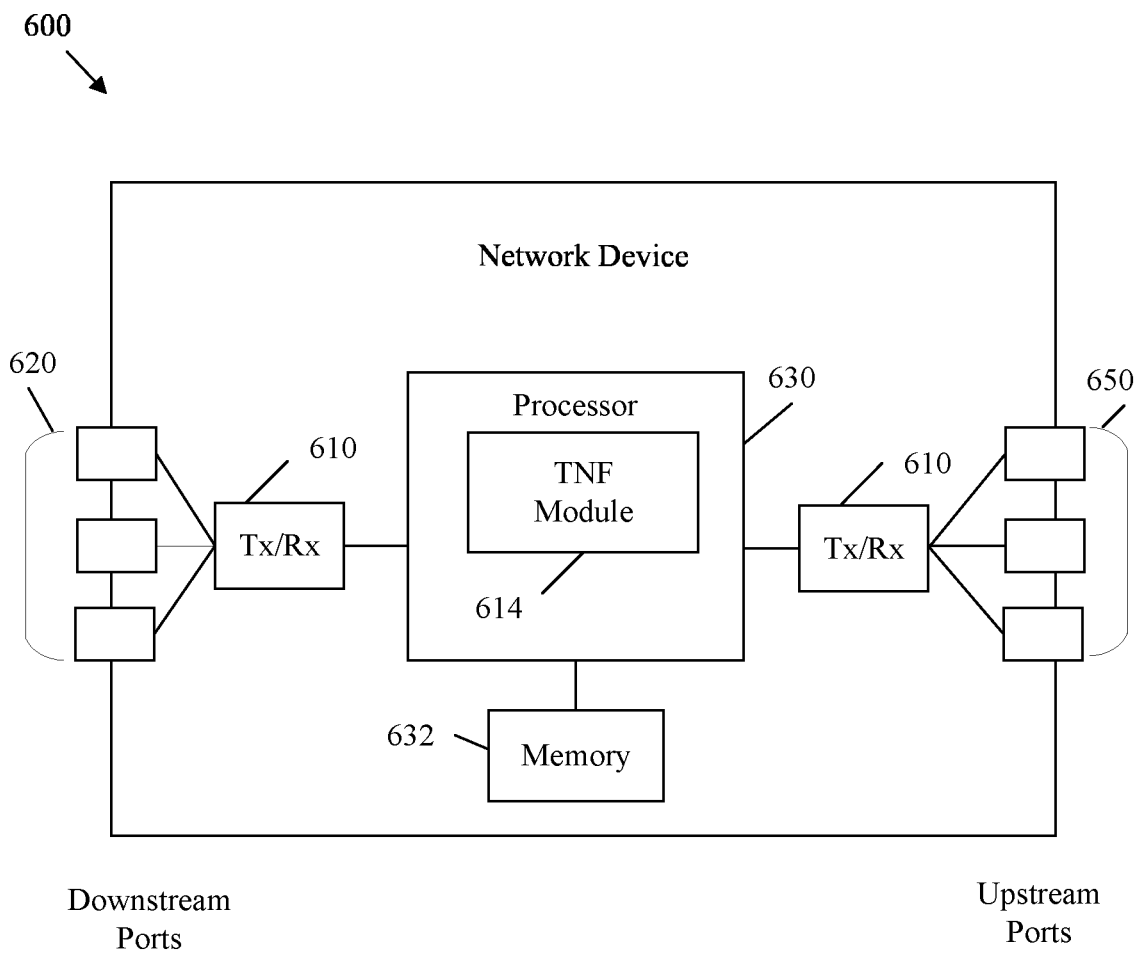
FIG. 6 is a schematic diagram of an example network device for managing TE path routing from a 5G virtualized control plane.

FIG. 6 is a schematic diagram of an example network device 600 for managing TE path routing from a 5G virtualized control plane, such as 5G virtualized control plane 200. Further, the network device 600 may implement any device in 5G network 100, 400, and/or 500 and/or a 5G transport network 300, such as a TNF, a SMF, a AMF, an NSSF, a gNB, a UPF, an AP UPF, a BP UPF, a CSR, etc. Also, network device 600 can be employed to implement methods 700 and/or 800 as discussed below as well as other methods/mechanisms disclosed herein.

Accordingly, the network device 600 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 600 is merely an example. Network device 600 is included for purposes of clarity of discussion, but is in no way meant to limit the application of the present disclosure to a particular network device embodiment or class of network device embodiments.

The network device 600 may be a device that communicates electrical and/or optical signals through a network, e.g., a switch, router, bridge, gateway, etc. In some cases, the network device 600 may act alone, or in concert with other network devices 600 to operate a virtual network device with the functionality described herein. As shown in FIG. 6, the network device 600 may comprise transceivers (Tx/Rx) 610, which may be transmitters, receivers, or combinations thereof. A Tx/Rx 610 may be coupled to a plurality of downstream ports 620 (e.g., downstream interfaces) for transmitting and/or receiving frames from other nodes and a Tx/Rx 610 may be coupled to a plurality of upstream ports 650 (e.g., upstream interfaces) for transmitting and/or receiving frames from other nodes, respectively. A processor 630 may be coupled to the Tx/Rxs 610 to process the data signals and/or determine which nodes to send data signals to. The processor 630 may comprise one or more multi-core processors and/or memory devices 632, which may function as data stores, buffers, etc. Processor 630 may be implemented as a general processor or may be part of one or more application specific integrated circuits (ASICs) and/or digital signal processors (DSPs). The network device 600 may comprise a TNF module 614, which may be configured to act as a TNF and/or operate other components of the 5G virtualized control plane. The TNF module 614 may be implemented in a general purpose processor, a field programmable gate array (FPGA), an ASIC, a DSP, a microcontroller, etc. In alternative embodiments, the TNF module 614 may be implemented in processor 630 as computer executable instructions stored in memory device 632 (e.g., as a computer program product stored in a non-transitory computer readable medium), which may be executed by processor 630, and/or implemented in part in the processor 630 and in part in the memory device 632. The downstream ports 620 and/or upstream ports 650 may contain wireless, electrical, and/or optical transmitting and/or receiving components, depending on the embodiment.

In summary, this disclosure specifies a framework and a mapping function for a 5G mobile user plane with transport network slicing, integrated with Mobile Radio Access and a Virtualized Core Network. The integrated approach is specified in a way to fit into the 5G core network architecture. The disclosure focuses on an optimized mobile user plane functionality with various transport services needed for some of the 5G traffic needing low and deterministic latency, real-time, or mission-critical services. This disclosure describes, how this objective is achieved agnostic to the transport underlay used (IPv4, IPv6, MPLS) in various deployments and with a transport network underlay routing called PPR. UPFs are the data forwarding entities in the 5GC architecture. The architecture allows the placement of BP and ULCL UPFs closer to the access network (5G-AN). The 5G-AN can be a radio access network or any non-3GPP access network, for example, a wireless local area network (WLAN). The IP address is anchored by a PDU session anchor UPF (PSA UPF). The interface between the BP/ULCL UPF and the PSA UPF is called N9. While a cellular user plane (GTP-U) may be employed for the N9 interface, other user plane protocols along with GTP-U may be used for the N9 interface. The N3 is between the 5G-AN and the UPF. The N3 interface is similar to the user plane interface (SIU) in long term evolution (LTE). The disclosed mechanisms may not change N3 user plane encapsulations to realize the benefits with the approach specified herein. Further, the disclosed mechanisms can work with any encapsulation (including GTP-U) for the N9 interface.

Network slicing may be a core capability of the 5GC with slice awareness from the radio network and the 5GC network. The present disclosure also defines various SSC modes and mobility scenarios for 5G. The 5GS as defined allows the transport network between N3 and N9 interfaces to work independently with various TE technologies. However, the lack of underlying TN awareness may otherwise lead to selection of sub-optimal UPF(s) and/or 5G-AN during 5GS procedures. This could lead to inability to meet SLAs for real-time, mission-critical, or latency sensitive services. These 5GS procedures including but not limited to Service Request, PDU Session Establishment, or UE mobility may need the same service level characteristics from the TN for the PDU session, similar to those as provided in Mobile Radio Access and 5GC for the various SST and 5QIs.

This disclosure specifies an example mechanism to fulfill the needs of 5GS to transport user plane traffic from 5G-AN to UPF for service continuity modes in an optimized fashion. This is done by keeping mobility procedures aware of underlying transport network along with slicing mechanisms. TN aware mobility can be built irrespective of underlying TN technology used. Using PPR as a TN underlay is also detailed. The disclosure further describes the applicability and procedures of the same with 5G SSC modes on N3 and N9 interfaces.

FIG. 2 depicts one of the scenarios of the 5G network with virtualized control component TNF. The CSR is shown connecting to gNB. The gNB is an entity in the 5G-AN. Though the CSR is shown as a separate block from the gNB, in some cases both of these can be co-located. This disclosure concerns with backhaul TN, from CSR to UPF on N3 interface or from a staging UPF to an anchor UPF on the N9 interface. From an encapsulation perspective, the N3 interface is similar to SIU in a 4G/LTE network and uses GTP-U to transport UE PDUs (IPv4, IPv6, IPv4v6, Ethernet or Unstructured). Unlike SIU, N3 has some additional aspects as there is no bearer concept and no per bearer GTP-U tunnels. Instead, QoS information is carried in the PDU Session Container GTP-U extension header. The N9 interface connects UPFs. TN Aware Mobility with optimized transport network functionality is explained herein. How PPR fits in this framework in detail along with other various TE technologies are also discussed herein.

The present disclosure employs an integrated approach between the access network, the transport network, and the core network. The NSSF is concerned with multiple aspects including selecting a network slice instance when requested by the AMF based on a requested specific network slice selection assistance information (SNSSAI), current location of a UE, roaming indication, etc. The NSSF also notifies network function service consumers (e.g., AMF) whenever the status of the slice availability changes. However, the scope of NSSF is only in 5GC (e.g., control and user plane) and the radio access network including the non-3GPP interworking function (N3IWF) for non-3GPP access. The network slice instance(s) selected by the NSSF are applicable at a per PDU session granularity. An SMF and UPF are allocated from the selected slice instance during the PDU session establishment procedure. Such procedures may not consider the resources and functionalities employed from the transport network for the selection of UPF. This may be seen as an independent functionality and not part of 5GS in some systems. However, when the transport network is not factored in an integrated fashion with respect to the available resources (with network characteristics from desired bandwidth, latency, burst size handling, and optionally jitter) some of the gains made with optimizations through 5G New Radio (5GNR) and 5GC can be degraded.

Adding the TNF to the control plane assuages the above situation. The TNF has the view of the underlying transport network with all links and nodes as well as various possible underlay paths with different characteristics. The TNF can be seen as supporting path computation element (PCE) functionality and optionally border gateway protocol link state (BGP-LS) to get the TE and topology information of the underlying IGP network. The Ns interface interacts with the 5G Access Network (e.g., gNB/CSR). The Ns interface can use one or more mechanisms such as path computation element protocol (PCEP), network configuration protocol (NETCONF), representational state transfer network configuration protocol (RESTCONF), and/or general open remote procedure call (gRPC) network management interface (gNMI) to provision the layer two/layer three VPNs along with TE underlay paths from gNB to UPF. The Ns and Nn interfaces can be part of the integrated 3GPP architecture.

These VPNs and/or underlay TE paths should be similar on all 5G-AN/CSRs and UPFs concerned to allow mobility of UEs while associated with one of the SSTs. The Nn may extend from one or more of the transport network nodes (e.g., ULCL/BP UPF and/or Anchor Point UPF) to the TNF. Nn enables learning the TE characteristics of all links and nodes of the network continuously (through BGP-LS and/or through a passive IGP adjacency and PCEP).

With the TNF in 5GS SBI, the following additional functionalities support end-to-end slice management in the transport network. The SNSSAI of the PDU session should be mapped to the assigned transport VPN and the TE path information for that slice. For transport slice assignment for various SSTs (cMBB, URLLC, and/or MIoT) corresponding underlay paths should be created and monitored from each transport end point (e.g., gNB/CSR and UPF). During PDU session creation, apart from radio and 5GC resources, the transport network resources should be verified as matching the characteristics of the PDU session traffic type. The TNF should provide an application programming interface (API) that takes as input the source and destination 3GPP user plane element address as well as required bandwidth, latency, and jitter characteristics between those user plane elements and returns as output a particular TE path's identifier that satisfies the requested requirements. Mapping of PDU session parameters to underlay SST paths should also be done. One way to do this to let the SMF install a forwarding action rule (FAR) in the UPF via N4 with the FAR pointing to a network instance in the UPF. A network instance is a logical identifier for an underlying network. The network instance pointed to by the FAR can be mapped to a transport path (through a layer two/layer three VPN). FARs are associated with a Packet Detection Rule (PDR). PDRs are used to classify packets in the uplink (UL) and the downlink (DL) direction. A UL GTP-U TE identifier (ID) and/or the QFI marked in the GTP-U packet can be used for classifying a packet belonging to particular slice characteristics. For DL, at a PSA UPF, the UE IP address is used to identify the PDU session, and hence the slice a packet belongs to and the IP five tuple can be used for identifying the flow and QoS characteristics to be applied on the packet. If any other form of encapsulation (other than GTP-U) is used, either on N3 or N9, corresponding QFI information should be included in the encapsulation header. In some SSC modes, if a segmented path (gNB to staging/ULCL/BPUPF to anchor-point UPF) is needed, then corresponding path characteristics should be used. This includes a path from gNB/CSR to UL-CL/BP UPF and UL-CL/BP UPF to eventual UPF access to DN. Continuous monitoring of transport path characteristics and reassignment at the endpoints should be performed. For all the affected PDU sessions, degraded transport paths should be updated dynamically with similar alternate paths. During UE mobility events (e.g., Xn based or N2 based), for target gNB selection, apart from radio resources, transport resources should be factored. This enables handling of all PDU sessions from the UE to target gNB and this employs co-ordination of gNB, AMF, and/or SMF with the TNF module. Integrating the TNF as part of the 5GS Service Based Interfaces, provides the flexibility to control the allocation of characteristics from the TN during a 5GS signaling procedure (e.g., PDU Session Establishment). If TNF is instead seen as a part of the management plane, this real time flexibility is lost. The TNF as part of the 5GC can be realized using Abstraction and Control of TE Networks (ACTN).

In a network implementing source routing, packets may be transported through the use of Segment Identifiers (SIDs), where a SID uniquely identifies a segment. In contrast, PPR can also be used as a backhaul routing mechanism. In PPR, the label/PPR-ID refer not to individual segments of which the path is composed, but to the identifier of a path that is deployed on network nodes. The fact that paths and path identifiers can be computed and controlled by a controller, and not by a routing protocol, allows the deployment of any path that network operators prefer, and not just shortest paths. As packets refer to a path towards a given destination and nodes make their forwarding decision based on the identifier of a path, not the identifier of a next segment node, packets may not need to carry a sequence of labels. This results in multiple benefits including significant reduction in network layer overhead, increased performance, and hardware compatibility for carrying both path and services along the path.

PPR may not remove GTP-U. Instead, PPR may work with the cellular user plane (e.g., GTP-U) for both N3 and any approach selected for N9 (encapsulation or no-encapsulation). In this scenario, PPR helps by providing TE benefits for 5G slices from a transport domain perspective. It does so without adding additional overhead to the user plane, unlike SR-MPLS or SRv6. This is achieved according to several mechanisms. For three different SSTs, three PPR-IDs can be signaled from any node in the transport network. For Uplink traffic, the 5G-AN chooses the correct PPR-ID of the UPF based on the S-NSSAI associated with the PDU Session and/or the QFI (e.g., 5QI) marking on the GTP-U encapsulation header. Similarly in the Downlink direction the matching PPR-ID of the 5G-AN is chosen based on the S-NSSAI associated with the PDU Session. The table below shows an example QFI Mapping with PPR-IDs on N3/N9.

TABLE 1

| QFI (Ranges) | SST in S-NSSAI | Transport Path Info | Transport Path Characteristics |
|---|---|---|---|
| Range Xx-Xy X1, X2(discrete values) | MIOT | PW ID/VPN info, PPR-ID-A | GBR Bandwidth: Bx Delay: Dx Jitter: Jx |
| Range Yx-Yy Y1, Y2(discrete values) | URLLC | PW ID/VPN info, PPR-ID-B | GBR with Delay Req. Bandwidth: By Delay: Dy Jitter: Jy |
| Range Zx-Zy Z1, Z2(discrete values) | EMBB | PW ID/VPN info, PPR-ID-C | Non-GBR Bandwidth: Bx |

It is possible to have a single PPR-ID for multiple input points through a PPR tree structure separate in UL and DL direction. The same set of PPRs may be created uniformly across all needed 5G-ANs and UPFs to allow various mobility scenarios. Any modification of TE parameters of the path, replacement path, and deleted path are updated from the TNF to the relevant ingress points. The same information can be pushed to the NSSF and/or SMF as desired. PPR can be supported with native IPv4 and IPv6 data/user planes with optional TE features. As this is an underlay mechanism, PPR may work with any overlay encapsulation approach including GTP-U for the N3 interface.

PPR includes path steering support for native IP user planes. PPR works in fully compatible way with SR defined user planes (SR-MPLS and SRv6) by reducing the path overhead and other challenges. PPR also expands the source routing to user planes beyond SR-MPLS and SRv6 (e.g., native IPv6 and IPv4 user planes). This helps transport networks to get the immediate path steering benefits and helps in overall migration strategy of the network to the desired user plane. These benefits can be realized with no hardware upgrades except control plane software for native IPv6 and IPv4 user planes.

PPR supports service level guarantee in the underlay. PPR also optionally allows for allocating resources that are to be reserved along the selected path. These resources are required in some cases (for some 5G SSTs with stringent GBR and latency requirements) not only for providing committed bandwidth or deterministic latency, but also for assuring overall service level guarantee in the network. This approach may not require per-hop provisioning, may support minimizing the number of protocols employed by the network, and may allow dynamism with FRR capabilities.

PPR supports 5GS functionality to transport the user plane traffic from 5G-AN to UPF in all three SSC modes. This is done in keeping the backhaul network at par with 5G slicing requirements that are applicable to the radio and virtualized core network to create an end-to-end slice path for 5G traffic. When a UE moves across the 5G-AN (e.g., from one gNB to another gNB), reconfiguration of the transport network may not be required with the approach above. The SSC mode may be specified/defaulted by the SMF. There may be no change in the mode once the connection is initiated.

SSC mode1, as depicted in FIG. 4 may occur after a UE has moved to another gNB in the same UPF serving area. In this mode, the IP address at the UE is preserved during mobility events. For respective slices, corresponding PPR-ID (e.g., TE Path) may be assigned to the packet at UL and DL directions. During Xn mobility, the source gNB may additionally ensure the transport path's resources from TNF are available at the target gNB apart from radio resources check (at decision and request phase of Xn/N2 mobility scenario).

SSC mode2, as depicted in FIG. 4, may occur if an IP Address is changed during mobility (e.g., a different UPF area), and then a corresponding PDU session is to be released. No session continuity from the network is provided in this mode. This is designed as an application offload and an application manages the session continuity if needed. For a PDU Session, service request and mobility mechanisms to select the transport resource and the PPR-ID (e.g., TE Path) is similar to SSC Model.

SSC mode3, as depicted in FIG. 5, may occur when a new IP address is assigned because a UE moved to another UPF coverage area, but the network should ensure the UE suffers no loss of connectivity. A connection through a new PDU session anchor point is established before the connection is terminated for better service continuity. There are two ways in which this happens. In one example, the SSC Mode 3 PDU session anchor may be changed with multiple PDU Sessions. In another example, the SSC Mode 3 PDU session anchor may be changed with an IPv6 multi-homed PDU session. In the first example, from a user plane perspective, the two PDU sessions are independent and the use of PPR-IDs by the gNB and UPFs is similar to SSC mode1 described above. The following paragraphs describe the IPv6 multi-homed PDU session case for SSC mode3.

In the uplink direction for the traffic offloading from the BP UPF, the packet has to reach to the right exit UPF. In this case the packet is re-encapsulated by the BP UPF (with either GTP-U or the chosen encapsulation) after bit rate enforcement and LI, towards the anchor UPF. At this point the packet should be on the appropriate VPN/pathway to the anchor UPF. This mapping is done based on the S-NSSAI associated with the PDU session and/or the QFI marking in the GTPU encapsulation header (e.g., 5QI value) to the PPR-ID of the exit node by selecting the respective TE PPR-ID (PPR path) of the UPF. If a non-MPLS underlay is used, a destination IP address of the encapsulation header is the mapped PPR-ID (TE path).

In the downlink direction for the incoming packet, the anchor UPF encapsulates the packet (with either GTP-U or the chosen encapsulation) to reach the BP UPF. Here the mapping is done based on the S-NSSAI associated with the PDU session, to the PPR-ID (TE Path) of the BP UPF. If a non-MPLS underlay is employed, the destination IP address of the encapsulation header is the mapped PPR-ID (TE path). In summary, respective PPR-ID on N3 and N9 is selected with correct transport characteristics from TNF. For N2 based mobility the SMF ensures transport resources are available for the N3 interface to the new BP UPF and from there the original anchor point UPF. For service continuity with multi-homed PDU session, the same transport network characteristics of the original PDU session (both on N3 and N9) should be observed for the newly configured IPv6 prefixes.

Other protocols may also be employed. RSVP-TE provides a lean transport overhead for the TE path for MPLS user plane. However, RSVP-TE may be less dynamic in some cases and may include some provisioning overhead across the N3 and N9 interface nodes. Also RSVP-TE may include excessive state refresh overhead across adjacent nodes. However, this issue can be mitigated with certain RSVP-TE scalability techniques.

SR-TE may also be used. However, SR-TE may not explicitly signal bandwidth reservation or mechanism to guarantee latency on the nodes/links on SR path. SR does allow path steering for any flow at the ingress, and a particular path for a flow can be chosen. SR-MPLS allows reduction of the control protocols to one IGP (without needing for label distribution protocol (LDP) and RSVP-TE). However, as specified above, the integrated TNF at a particular RSVP-TE path for MPLS or SR path for MPLS and IPv6 with SRH user plane, can be supplied to the SMF for mapping a particular PDU session to the transport path.

Figure 7:
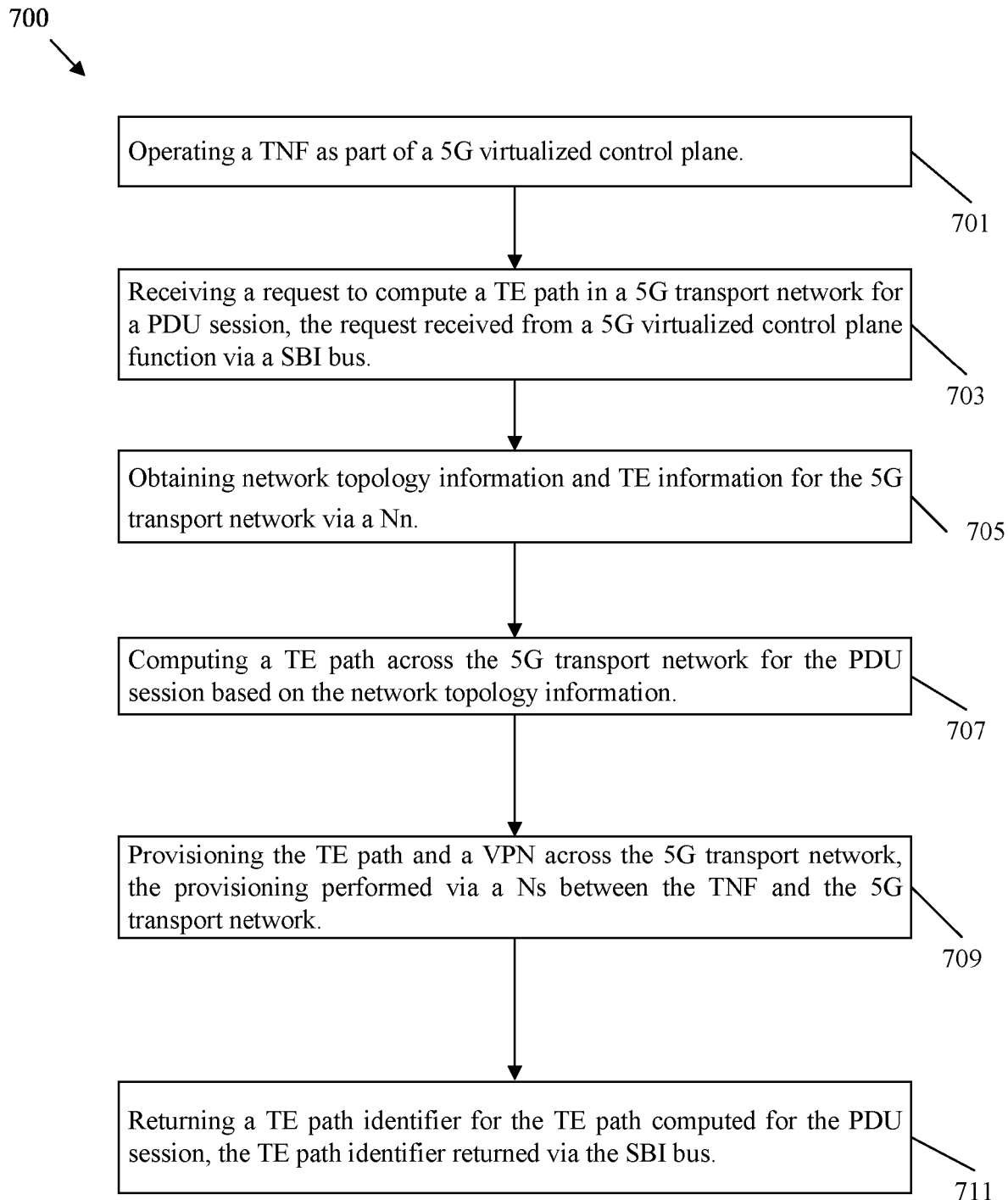
FIG. 7 is a flowchart of an example method for managing TE path routing from a 5G virtualized control plane.

FIG. 7 is a flowchart of an example method 700 for managing TE path routing from a 5G virtualized control plane, for example by a 5G virtualized control plane 200 managing a 5G network 100, 400, 500 and/or a 5G transport network 300.

The method 700 is implemented by a NE operating a TNF at step 701. The TNF may be implemented by a TNF 236, 436, and/or 536 as part of a 5G virtualized control plane. At step 703, the TNF receives a request to compute a TE path in a 5G transport network for a PDU session. The request is received at the TNF from a 5G virtualized control plane function via a SBI bus. The request to compute the TE path can be received from a gNB, an AMF, a NSSF, a SMF, or combinations thereof. In some cases, the request to compute the TE path can be received in response to a UE mobility event at a gNB. In this case, the request may be received to support maintaining an existing PDU session at a UE. In other cases, the request to compute the TE path can be received as part of initiating a new PDU session at the UE.

At step 705, the TNF obtains network topology information for the 5G transport network via a Nn. The Nn may extend between the TNF and a UPF associated with the PDU session, such as an AP UPF, a BP UPF, etc. The Nn may also extend between the TNF and a node along an N3 or an N9 interface. Step 705 may also include obtaining TE information for the 5G transport network via the Nn.

At step 707, the TNF may compute a TE path across the 5G transport network for the PDU session based on the network topology information. The TE path across the 5G transport network may also be computed based on the TE information.

At step 709, the TNF may provision the TE path and/or a corresponding transport VPN across the 5G transport network. The provisioning may be performed via a Ns between the TNF and the 5G transport network. The Ns may extend between the TNF and a CSR associated with the PDU session. The Ns may also extend between the TNF and the gNB, the UPF (e.g., AP UPF and/or BP UPF) and/or a node along an N3 or an N9 interface.

At step 711, the TNF can return a TE path identifier for the TE path computed for the PDU session. The TE path identifier can be returned via the SBI bus. For example, the TE path identifier for the TE path can be returned to the gNB, the AMF, the NSSF, the SMF, or combinations thereof. In a mobility example, the TE path identifier indicates a TE path for use by the UE to maintain the PDU session upon moving to a destination gNB. The TE path identifier may be employed to support mapping a SNSSAI of the PDU session to the transport VPN and TE path for a 5G network slice. Such mapping can be performed by a NSSF and returned to a CSR, UPF, node on an N3/N9 interface, etc. In some examples, the TE path across the 5G transport network can be provisioned via the Ns based on PPR protocol by forwarding the TE path via the Ns to support maintenance of one or more PPR-IDs to control routing of PDU session packets traversing the 5G network slice.

Figure 8:
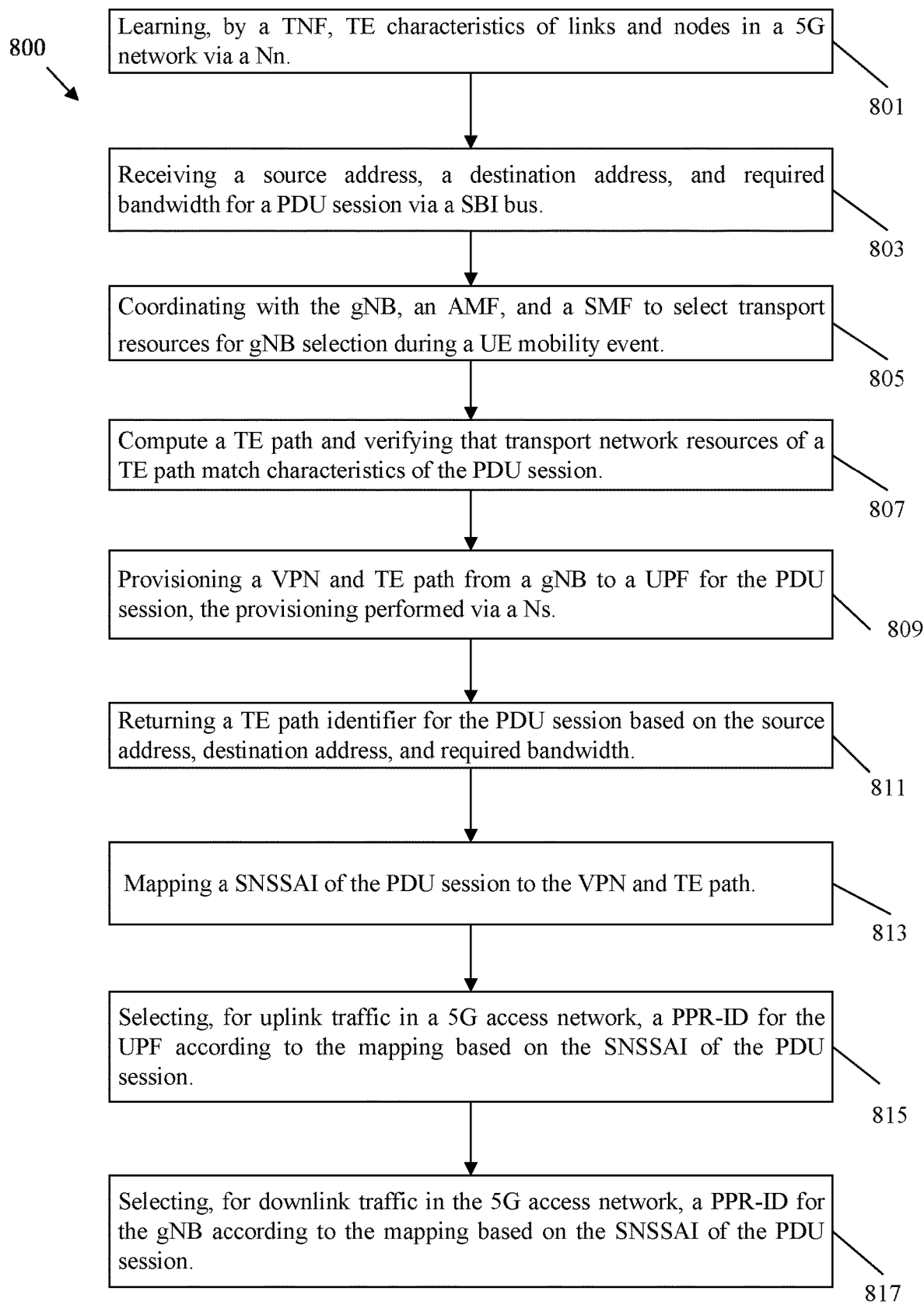
FIG. 8 is a flowchart of another example method for managing TE path routing from a 5G virtualized control plane.

FIG. 8 is a flowchart of another example method 800 for managing TE path routing from a 5G virtualized control plane, for example by a 5G virtualized control plane 200 managing a 5G network 100, 400, 500 and/or a 5G transport network 300. At step 801, a TNF may learn TE characteristics of links and nodes in a 5G network via a Nn. The Nn may communicate between the TNF and a branching point UPF or between the TNF and an anchor point UPF.

At step 803, the TNF may receive a source address, a destination address, and/or a required bandwidth for a PDU session via a SBI bus. At step 805, the TNF may coordinate with a gNB, an AMF, and a SMF to select transport resources for gNB selection during a UE mobility event. At step 807, the TNF may compute a TE path and verify that transport network resources of the TE path match characteristics of the PDU session.

At step 809, the TNF may provision a VPN and TE path from a gNB to a UPF for the PDU session. The provisioning is performed via a Ns. The Ns may interact between the TNF and the gNB or between the TNF and CSR. At step 811, the TNF may return a TE path identifier for the PDU session based on the source address, destination address, and required bandwidth.

Accordingly, a NSSF can map a SNSSAI of the PDU session to the VPN and TE path at step 813. This supports selecting, for uplink traffic in a 5G access network, a PPR-ID for the UPF at a CSR/gNB according to the mapping based on the SNSSAI of the PDU session at step 815. This also supports selecting, for downlink traffic in the 5G access network, a PPR-ID for the gNB at the UPF according to the mapping based on the SNSSAI of the PDU session at step 817.

In the case of that method 800 is employed as part of a mobility event, the 5G access network can be operating in SSC mode 1, such that an IP address of the UE is preserved during mobility events. Accordingly, the method 800 may further comprise communicating, by the TNF, with a source gNB to confirm that transport path resources at a target gNB are available during UE mobility. The 5G access network can also be operating in SSC mode 2, such that the PDU session is released when an IP address of the UE is changed during mobility. In such a case, no session continuity from the network is provided during mobility. The 5G access network may also be operating in SSC mode 3, such that a new IP address is assigned to the UE because the UE moved to another UPF coverage area. In such a case, a subsequent connection through a new PDU session anchor point is established before an initial connection is terminated. In this case, the method 800 may further comprise including, by a branching point UPF, an uplink packet onto a TE path to an anchor point UPF according to the mapping based on the SNSSAI of the PDU session. The method 800 may further comprise including, by the anchor point UPF, a downlink packet onto a TE path to the branching point UPF according to the mapping based on the SNSSAI of the PDU session. The SSC mode may be selected by an AMF.

Figure 9:
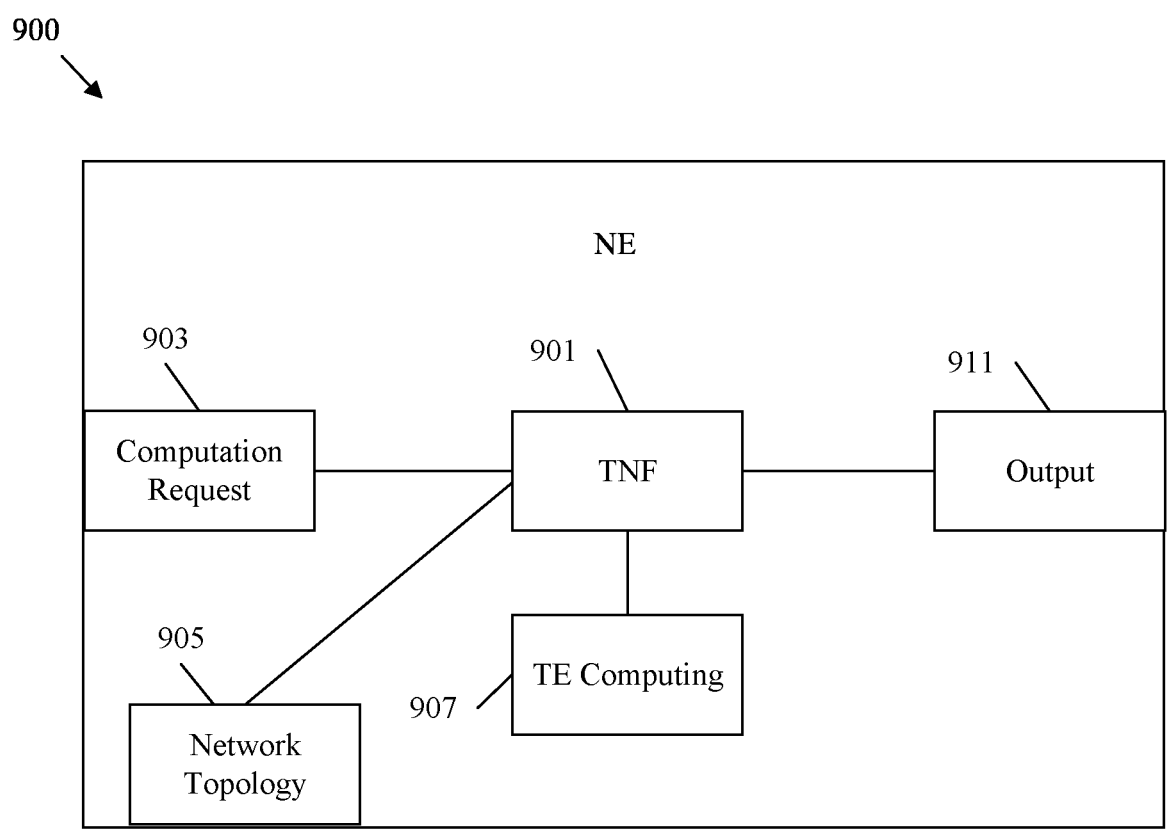
FIG. 9 is a schematic diagram of another example of a NE for managing TE path routing from a 5G virtualized control plane.

FIG. 9 is a schematic diagram of another example of a network element (NE) 900 for managing TE path routing from a 5G virtualized control plane. The NE 900 comprises a TNF module 901 for operating a TNF as part of a 5G virtualized control plane. The NE 900 further comprises a computation request module 903 for receiving a request to compute a TE path in a 5G transport network for a PDU session, the request received from a 5G virtualized control plane function via a SBI bus. The NE 900 further comprises a network topology module 905 for obtaining network topology information for the 5G transport network via a Nn. The NE 900 further comprises a TE computing module 907 for computing a TE path across the 5G transport network for the PDU session based on the network topology information. The NE 900 further comprises an output module 911 for returning a TE path identifier for the TE path, the TE path identifier returned via the SBI bus.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
learning, by a transport network function (TNF), traffic engineering (TE) characteristics of links and nodes in a fifth generation wireless (5G) network via a northbound interface (Nn);
receiving, by the TNF, a source address, a destination address, and required bandwidth for a packet data unit (PDU) session via a service based interface (SBI) bus;
provisioning, by the TNF, a virtual private network (VPN) and a TE path from a 5G nodeB (gNB) to a user plane function (UPF) for the PDU session, the provisioning performed via a southbound interface (Ns); and
returning, by the TNF, a TE path identifier for the PDU session based on the source address, the destination address, and the required bandwidth.

2. The method of claim 1, further comprising verifying, by the TNF, that transport network resources of the TE path match characteristics of the PDU session.

3. The method of claim 1, further comprising coordinating, by the TNF with the gNB, an access management function (AMF) and a session management function (SMF) to select transport resources for gNB selection during a user equipment (UE) mobility event.

4. The method of claim 1, wherein the Ns interacts between the TNF and the gNB or between the TNF and a cell site router (CSR).

5. The method of claim 1, wherein the Nn communicates between the TNF and a branching point UPF or between the TNF and an anchor point UPF.

6. The method of claim 1, further comprising:
mapping a specific network slice selection assistance information (SNSSAI) of the PDU session to the VPN and the TE path; and
selecting, for uplink traffic in a 5G access network, a preferred path routing (PPR)-identifier (ID) for the UPF according to the mapping and based on the SNSSAI of the PDU session.

7. The method of claim 6, further comprising selecting, for downlink traffic in the 5G access network, a PPR-ID for the gNB according to the mapping based on the SNSSAI of the PDU session.

8. The method of claim 6, wherein the 5G access network is operating in session and service continuity (SSC) mode 1, such that an Internet Protocol (IP) address of a user equipment (UE) is preserved during mobility events, and wherein the method further comprises communicating, by the TNF with a source gNB to confirm that transport path resources at a target gNB are available during UE mobility.

9. The method of claim 6, wherein the 5G access network is operating in session and service continuity (SSC) mode 2, such that the PDU session is released when an Internet Protocol (IP) address of a user equipment (UE) is changed during mobility, and wherein no session continuity from the network is provided during mobility.

10. The method of claim 6, wherein the 5G access network is operating in session and service continuity (SSC) mode 3, such that a new Internet Protocol (IP) address is assigned to a user equipment (UE) because the UE moved to another UPF coverage area, wherein a subsequent connection through a new PDU session anchor point is established before an initial connection is terminated, the method further comprising:
including, by a branching point UPF, an uplink packet onto an anchor point TE path to an anchor point UPF according to the mapping and based on the SNSSAI of the PDU session; and
including, by the anchor point UPF, a downlink packet onto a branching point TE path to the branching point UPF according to the mapping and based on the SNSSAI of the PDU session.

11. A network element (NE) comprising:
a transmitter;
a receiver;
a memory storing instructions; and
at least one processor in communication with the transmitter, the receiver, and the memory, the at least one processor configured, upon execution of the instructions, to perform the following steps:
learning, by a transport network function (TNF), traffic engineering (TE) characteristics of links and nodes in a fifth generation wireless (5G) network via a northbound interface (Nn);
receiving, by the TNF, a source address, a destination address, and required bandwidth for a packet data unit (PDU) session via a service based interface (SBI) bus;
provisioning, by the TNF, a virtual private network (VPN) and TE path from a 5G nodeB (gNB) to a user plane function (UPF) for the PDU session, the provisioning performed via a southbound interface (Ns); and
returning, by the TNF, a TE path identifier for the PDU session based on the source address, the destination address, and the required bandwidth.

12. The NE of claim 11, further comprising verifying, by the TNF, that transport network resources of the TE path match characteristics of the PDU session.

13. The NE of claim 11, further comprising coordinating, by the TNF with the gNB, an access management function (AMF) and a session management function (SMF) to select transport resources for gNB selection during a user equipment (UE) mobility event.

14. The NE of claim 11, wherein the Ns interacts between the TNF and the gNB or between the TNF and a cell site router (CSR).

15. The NE of claim 11, wherein the Nn communicates between the TNF and a branching point UPF or between the TNF and an anchor point UPF.

16. The NE of claim 11, further comprising:
mapping a specific network slice selection assistance information (SNSSAI) of the PDU session to the VPN and the TE path; and
selecting, for uplink traffic in a 5G access network, a preferred path routing (PPR)-identifier (ID) for the UPF according to the mapping and based on the SNSSAI of the PDU session.

17. The NE of claim 16, further comprising selecting, for downlink traffic in the 5G access network, a PPR-ID for the gNB according to the mapping based on the SNSSAI of the PDU session.

18. The NE of claim 16, wherein the 5G access network is operating in session and service continuity (SSC) mode 1, such that an Internet Protocol (IP) address of a user equipment (UE) is preserved during mobility events, and wherein the at least one processor is configured to perform the step of communicating, by the TNF, with a source gNB to confirm that transport path resources at a target gNB are available during UE mobility.

19. The NE of claim 16, wherein the 5G access network is operating in session and service continuity (SSC) mode 2, such that the PDU session is released when an Internet Protocol (IP) address of a user equipment (UE) is changed during mobility, and wherein no session continuity from the network is provided during mobility.

20. The NE of claim 16, wherein the 5G access network is operating in session and service continuity (SSC) mode 3, such that a new Internet Protocol (IP) address is assigned to a user equipment (UE) because the UE moved to another UPF coverage area, wherein a subsequent connection through a new PDU session anchor point is established before an initial connection is terminated, the at least one processor further executing the instructions to perform:
- including, by a branching point UPF, an uplink packet onto an anchor point TE path to an anchor point UPF according to the mapping and based on the SNSSAI of the PDU session; and
- including, by the anchor point UPF, a downlink packet onto a branching point TE path to the branching point UPF according to the mapping and based on the SNSSAI of the PDU session.

\* \* \* \* \*